(12) United States Patent
Kvasnicka et al.

(10) Patent No.: US 10,866,012 B2
(45) Date of Patent: Dec. 15, 2020

(54) ROOFING, CLADDING OR SIDING APPARATUS

(71) Applicant: Zinniatek Limited, Auckland (NZ)

(72) Inventors: Johan Miros Kvasnicka, Greenhithe (NZ); Andrew Leo Haynes, Red Beach (NZ); Christopher Charles Morrow, Papakura (NZ)

(73) Assignee: Zinniatek Limited, Auckland (NZ)

( * ) Notice: Subject to any disclaimer, the term of this patent is extended or adjusted under 35 U.S.C. 154(b) by 0 days.

(21) Appl. No.: 14/910,988

(22) PCT Filed: Dec. 1, 2015

(86) PCT No.: PCT/IB2015/059228
§ 371 (c)(1),
(2) Date: Feb. 8, 2016

(87) PCT Pub. No.: WO2016/088025
PCT Pub. Date: Jun. 9, 2016

(65) Prior Publication Data
US 2017/0321933 A1 Nov. 9, 2017

Related U.S. Application Data

(60) Provisional application No. 62/086,017, filed on Dec. 1, 2014.

(51) Int. Cl.
*E04D 1/00* (2006.01)
*E04D 1/34* (2006.01)
(Continued)

(52) U.S. Cl.
CPC .......... *F24S 25/636* (2018.05); *E04D 1/2918* (2019.08); *E04D 1/34* (2013.01);
(Continued)

(58) Field of Classification Search
CPC ..... E04D 1/00; E04D 1/24; E04D 1/34; E04D 2001/3408; E04D 2001/3414
See application file for complete search history.

(56) References Cited

U.S. PATENT DOCUMENTS 1,004,338 A * 9/1911 Austin ...................... E04D 1/04
52/518
1,266,137 A * 5/1918 Melde ..................... E04D 1/265
52/533
(Continued)

FOREIGN PATENT DOCUMENTS

CA 2794345 A1 5/2013
DE 46673 C 4/1889
(Continued)

OTHER PUBLICATIONS

Supplementary European Search Report for European Patent Application No. 1285444, dated Oct. 16, 2015, 10 pages.
(Continued)

*Primary Examiner* — Phi D A
(74) *Attorney, Agent, or Firm* — Foley & Lardner LLP

(57) ABSTRACT

A roofing, cladding, or siding apparatus comprises a roofing, cladding, or siding module and at least one clip. The module comprises an underlapping region and an exposed region. The underlapping region is adapted to be substantially covered by the exposed region of an adjacent overlapping module when installed on a building surface. A projection extends from the exposed region to provide a bearing surface facing the under surface of the exposed region. The clip or clips is attachable to the underlapping region to provide a tongue adapted to be received between the bearing surface and the under surface of the exposed region of an adjacent overlapping module when installed on a building surface.

34 Claims, 14 Drawing Sheets

(51) Int. Cl.
| | | |
|---|---|---|
| *E04F 13/18* | (2006.01) | |
| *F24S 25/636* | (2018.01) | |
| *E04F 13/08* | (2006.01) | |
| *E04D 3/365* | (2006.01) | |
| *H02S 20/23* | (2014.01) | |
| *F24S 25/613* | (2018.01) | |
| *E04D 13/17* | (2006.01) | |
| *F24S 20/00* | (2018.01) | |
| *E04D 1/30* | (2006.01) | |

(52) U.S. Cl.
CPC ............. *E04D 3/365* (2013.01); *E04D 13/17* (2013.01); *E04F 13/0837* (2013.01); *E04F 13/0841* (2013.01); *E04F 13/0894* (2013.01); *E04F 13/18* (2013.01); *F24S 25/613* (2018.05); *H02S 20/23* (2014.12); *E04D 2001/309* (2013.01); *E04D 2001/3408* (2013.01); *E04D 2001/3438* (2013.01); *E04D 2001/3447* (2013.01); *E04D 2001/3455* (2013.01); *E04D 2001/3458* (2013.01); *E04D 2001/3467* (2013.01); *E04D 2001/3482* (2013.01); *E04F 13/0864* (2013.01); *E04F 2201/0558* (2013.01); *F24S 2020/10* (2018.05); *Y02B 10/12* (2013.01)

(56) References Cited

U.S. PATENT DOCUMENTS

| | | | | |
|---|---|---|---|---|
| 1,634,126 | A * | 6/1927 | Tyra | E04D 1/06 52/521 |
| 1,678,333 | A * | 7/1928 | Figge | E04D 1/34 52/545 |
| 1,741,515 | A * | 12/1929 | Halprin | E04D 1/34 52/545 |
| 1,941,216 | A * | 12/1933 | McKeown | E04D 1/34 52/545 |
| 2,149,818 | A * | 3/1939 | North | E04D 1/28 52/24 |
| 2,260,446 | A * | 10/1941 | Fooks, Jr. | E04D 1/34 52/544 |
| 2,362,236 | A * | 11/1944 | Bassler | E04D 1/08 52/309.1 |
| 2,568,603 | A * | 9/1951 | Anthony | E04D 1/34 52/544 |
| 2,624,298 | A | 1/1953 | Farren | |
| 2,756,699 | A * | 7/1956 | Lockwood | E04D 1/16 52/546 |
| 2,766,861 | A * | 10/1956 | Abramson | E04F 13/0864 52/530 |
| 3,058,265 | A * | 10/1962 | Lapsensohn | E04D 1/18 52/24 |
| 3,332,830 | A | 7/1967 | Tomlinson | |
| 3,357,064 | A * | 12/1967 | Munse | F16B 5/128 24/291 |
| 3,661,410 | A * | 5/1972 | Larson | E05B 65/0817 52/127.9 |
| 4,141,182 | A * | 2/1979 | McMullen | E04D 13/10 52/24 |
| 4,288,959 | A | 9/1981 | Murdock | |
| 4,319,437 | A * | 3/1982 | Murphy | F24S 20/67 52/220.1 |
| 4,411,117 | A * | 10/1983 | Bolha | E04F 13/0864 52/521 |
| 4,426,823 | A * | 1/1984 | Kobe | E04D 1/045 52/544 |
| 4,712,351 | A * | 12/1987 | Kasprzak | E04F 13/0864 52/547 |
| 4,956,140 | A | 9/1990 | Rolles et al. | |
| 5,053,180 | A | 10/1991 | Wang et al. | |
| 5,070,671 | A | 12/1991 | Fifield et al. | |
| 5,076,037 | A * | 12/1991 | Crick | E04D 1/265 52/520 |
| 5,094,058 | A | 3/1992 | Slocum | |
| 5,100,274 | A * | 3/1992 | Hasan | E04D 3/3603 411/368 |
| 5,295,339 | A | 3/1994 | Manner | |
| 5,347,785 | A | 9/1994 | Terrenzio et al. | |
| 5,437,735 | A | 8/1995 | Younan et al. | |
| 5,475,963 | A * | 12/1995 | Chelednik | E04F 13/0864 52/514 |
| 5,615,523 | A | 4/1997 | Wells et al. | |
| 5,615,527 | A * | 4/1997 | Attley | E04D 1/06 52/518 |
| 5,630,305 | A | 5/1997 | Hlasnicek | |
| 5,651,226 | A | 7/1997 | Archibald | |
| 5,690,876 | A | 11/1997 | Gallo, Jr. | |
| 5,711,126 | A | 1/1998 | Wells | |
| 6,021,611 | A | 2/2000 | Wells et al. | |
| 6,145,264 | A * | 11/2000 | Dallaire | E04B 9/247 248/214 |
| 6,164,034 | A | 12/2000 | Roetheli et al. | |
| 6,201,179 | B1 | 3/2001 | Dalacu | |
| 6,220,956 | B1 | 4/2001 | Kilian et al. | |
| 6,248,271 | B1 | 6/2001 | Graham et al. | |
| 6,856,496 | B1 | 2/2005 | Mucci et al. | |
| 6,908,295 | B2 | 6/2005 | Thielman et al. | |
| 6,941,706 | B2 | 9/2005 | Austin et al. | |
| 7,520,098 | B1 | 4/2009 | Martinique et al. | |
| 7,735,287 | B2 * | 6/2010 | Gaudreau | E04D 1/265 52/525 |
| 8,020,353 | B2 * | 9/2011 | Gaudreau | E04F 13/0864 52/520 |
| 8,215,070 | B2 | 7/2012 | Railkar et al. | |
| 8,245,475 | B1 * | 8/2012 | Thomson | E04D 1/20 52/546 |
| 8,307,599 | B2 * | 11/2012 | Jenkins | E04D 1/20 52/533 |
| 8,333,356 | B2 * | 12/2012 | Ernst | A47G 25/0607 248/223.41 |
| 8,402,707 | B2 * | 3/2013 | Mitchell | E04C 2/38 52/287.1 |
| 8,468,754 | B2 | 6/2013 | Railkar et al. | |
| 8,567,601 | B2 | 10/2013 | Turek et al. | |
| 8,713,860 | B2 | 5/2014 | Railkar et al. | |
| 8,713,882 | B2 | 5/2014 | Kalkanoglu et al. | |
| 8,763,339 | B2 | 7/2014 | Bryson et al. | |
| 9,322,173 | B2 * | 4/2016 | Pisani | E04D 1/14 |
| 9,416,540 | B2 | 8/2016 | Allen et al. | |
| 9,518,391 | B2 | 12/2016 | Haynes et al. | |
| 2001/0022055 | A1 | 9/2001 | Zhang | |
| 2002/0037630 | A1 | 3/2002 | Agarwal et al. | |
| 2003/0154667 | A1 | 8/2003 | Dinwoodie | |
| 2004/0009338 | A1 | 1/2004 | Jo et al. | |
| 2004/0074156 | A1 | 4/2004 | Haynes | |
| 2005/0072091 | A1 | 4/2005 | Morris | |
| 2005/0072092 | A1 | 4/2005 | Williams | |
| 2005/0178429 | A1 | 8/2005 | McCaskill et al. | |
| 2005/0239394 | A1 | 10/2005 | O'Hagin et al. | |
| 2005/0262797 | A1 | 12/2005 | Davis | |
| 2006/0026908 | A1 | 2/2006 | Gregori et al. | |
| 2006/0080942 | A1 * | 4/2006 | O'Neill | E04D 1/16 52/790.1 |
| 2007/0039274 | A1 | 2/2007 | Harrington et al. | |
| 2007/0078191 | A1 | 4/2007 | Guhde et al. | |
| 2007/0119109 | A1 * | 5/2007 | Kuelker | B28B 23/005 52/364 |
| 2007/0144096 | A1 * | 6/2007 | O'Neal | E04F 13/0864 52/520 |
| 2007/0193620 | A1 | 8/2007 | Hines et al. | |
| 2007/0266562 | A1 | 11/2007 | Friedman et al. | |
| 2008/0000174 | A1 | 1/2008 | Flaherty et al. | |
| 2008/0000512 | A1 | 1/2008 | Flaherty et al. | |
| 2008/0121270 | A1 | 5/2008 | Mayer et al. | |
| 2008/0184645 | A1 * | 8/2008 | Trabue | E04D 1/265 52/525 |
| 2008/0185748 | A1 | 8/2008 | Kalkanoglu | |
| 2008/0271773 | A1 | 11/2008 | Jacobs et al. | |
| 2008/0302030 | A1 | 12/2008 | Stancel et al. | |

(56) References Cited

U.S. PATENT DOCUMENTS

| | | |
|---|---|---|
| 2008/0302031 A1 | 12/2008 | Bressler et al. |
| 2009/0000222 A1 | 1/2009 | Kalkanoglu et al. |
| 2009/0215304 A1 | 8/2009 | Faust et al. |
| 2010/0037548 A1 | 2/2010 | Kalkanoglu et al. |
| 2010/0083602 A1* | 4/2010 | Pollack .................. E04D 1/34 52/584.1 |
| 2010/0141042 A1 | 6/2010 | Kesler et al. |
| 2010/0170169 A1 | 7/2010 | Railkar et al. |
| 2010/0236162 A1* | 9/2010 | Tweedie ................. F24S 25/61 52/127.6 |
| 2010/0237709 A1 | 9/2010 | Hall et al. |
| 2010/0313501 A1 | 12/2010 | Gangemi |
| 2011/0000535 A1 | 1/2011 | Davidson |
| 2011/0012430 A1 | 1/2011 | Cheng et al. |
| 2011/0017282 A1 | 1/2011 | Tas et al. |
| 2011/0037322 A1 | 2/2011 | Kanno |
| 2011/0041428 A1 | 2/2011 | Posnansky |
| 2011/0041518 A1 | 2/2011 | Peterson et al. |
| 2011/0047894 A1 | 3/2011 | Shadwell et al. |
| 2011/0214372 A1 | 9/2011 | Mullet et al. |
| 2011/0277408 A1 | 11/2011 | Turek et al. |
| 2012/0019074 A1 | 1/2012 | Frolov et al. |
| 2012/0098350 A1 | 4/2012 | Campanella et al. |
| 2012/0117908 A1 | 5/2012 | Turek et al. |
| 2013/0095293 A1 | 4/2013 | Boss et al. |
| 2013/0167463 A1 | 7/2013 | Duve |
| 2013/0193769 A1 | 8/2013 | Mehta et al. |
| 2013/0233385 A1 | 9/2013 | Reese et al. |
| 2013/0255755 A1 | 10/2013 | Chich |
| 2013/0263534 A1 | 10/2013 | Railkar et al. |
| 2014/0090696 A1 | 4/2014 | Rodrigues et al. |
| 2014/0090697 A1 | 4/2014 | Rodrigues et al. |
| 2014/0190921 A1* | 7/2014 | Thomson ................. E04D 1/20 215/10 |
| 2014/0259998 A1 | 9/2014 | Railkar et al. |
| 2014/0259999 A1 | 9/2014 | Rodrigues et al. |
| 2014/0260001 A1 | 9/2014 | Kiik et al. |
| 2014/0265609 A1 | 9/2014 | Rodrigues et al. |
| 2015/0047285 A1 | 2/2015 | Dejarnette et al. |
| 2015/0240495 A1 | 8/2015 | Vermilion et al. |
| 2018/0123503 A1 | 5/2018 | Haynes et al. |

FOREIGN PATENT DOCUMENTS

| | | |
|---|---|---|
| DE | 20 02 738 A1 | 7/1971 |
| DE | 42 16 171 A1 | 1/1993 |
| DE | 20 2005 002 105 | 6/2005 |
| DE | 102010009595 A1 | 9/2011 |
| DE | 10 2010 019 815 A1 | 11/2011 |
| EP | 0 436 572 | 11/1995 |
| EP | 2 009 704 | 12/2008 |
| EP | 2 075 389 A2 | 7/2009 |
| EP | 2 256 894 | 12/2010 |
| EP | 2 494 124 | 5/2014 |
| EP | 2 785 930 | 11/2015 |
| EP | 2 547 837 | 4/2017 |
| EP | 3 227 507 | 10/2017 |
| GB | 2 141 157 | 12/1984 |
| GB | 2 344 836 | 8/2002 |
| JP | S54-121515 A | 9/1979 |
| JP | S61-169562 A | 7/1986 |
| JP | H534623 A | 2/1993 |
| JP | H06-108549 A | 4/1994 |
| JP | H09-275644 A | 10/1997 |
| JP | H11-36540 A | 2/1999 |
| JP | 2001-295422 | 10/2001 |
| JP | 2002-235955 | 8/2002 |
| JP | 2003-049509 | 2/2003 |
| JP | 2005-191578 A | 7/2005 |
| JP | 2008-034557 A | 2/2008 |
| JP | 2011-041464 | 2/2011 |
| JP | 5118102 | 1/2013 |
| JP | 2015-502726 | 1/2015 |
| JP | 2018-011504 | 1/2018 |
| KR | 20110128094 | 11/2011 |
| NZ | 715037 | 5/2013 |
| WO | WO-98/57009 | 12/1998 |
| WO | WO-00/23673 A1 | 4/2000 |
| WO | WO-02/093655 | 11/2002 |
| WO | WO-2006/063333 A2 | 6/2006 |
| WO | WO-2007/058548 A1 | 5/2007 |
| WO | WO-2008/137966 A2 | 11/2008 |
| WO | WO-2010/036980 | 4/2010 |
| WO | WO-2010/150316 | 12/2010 |
| WO | WO-2011/027627 A1 | 3/2011 |
| WO | WO-2011/099109 A1 | 8/2011 |
| WO | WO-2012/021145 | 2/2012 |
| WO | WO-2013/067484 A1 | 5/2013 |
| WO | WO-2013/081477 A1 | 6/2013 |
| WO | WO-2013/112248 | 8/2013 |

OTHER PUBLICATIONS

Extended European Search Report for European Patent Application No. 12852960.9, dated May 27, 2015, 6 pages.

International Search Report for International Application No. PCT/NZ2012/000221, dated Apr. 3, 2013, 6 pages.

International Search Report regarding PCT/NZ2012/000222, dated Apr. 2, 2013, 7 pages.

International Search Report regarding International Application No. PCT/NZ2014/000094, dated Oct. 15, 2014, 11 pages.

Extended European Search Report, EP App. No. 15864647.1, Zinniatek Limited, 9 pages (Jul. 20, 2018).

ASTM D3462, Standard Specification for Asphalt Shingles Made from Glass Felt and Surfaced with Mineral Granules, downloaded Aug. 26, 2018, 4 pps.

Deck-ArmorTM Roof Protection (GAF Corp., Wayne, New Jersey), Updated Jul. 2018, 5 pps.

Examination Report for European Patent App. No. 15866038.1 dated Apr. 18, 2019, 6 pages.

U.S. Appl. No. 15/651,300, filed Jul. 17, 2017, Zinniatek Limited.

Office Action regarding Japanese Application No. 2017-528829, dated May 19, 2020, 3 pps. (with translation, also 3 pps.).

* cited by examiner

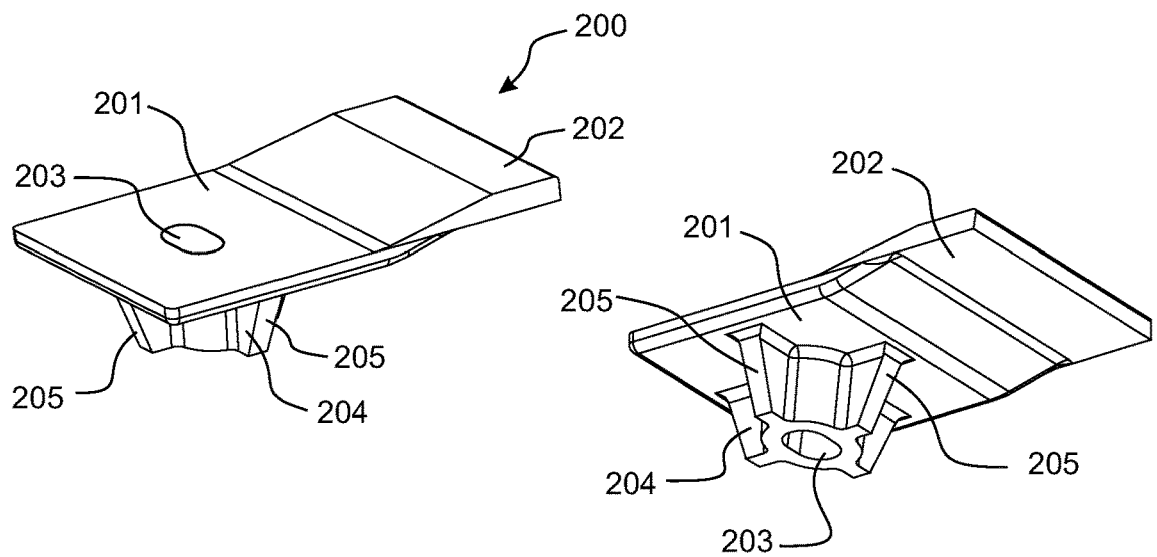
FIGURE 13A
FIGURE 13B
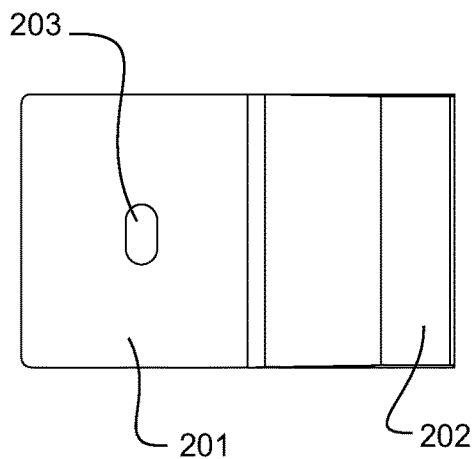
FIGURE 13C
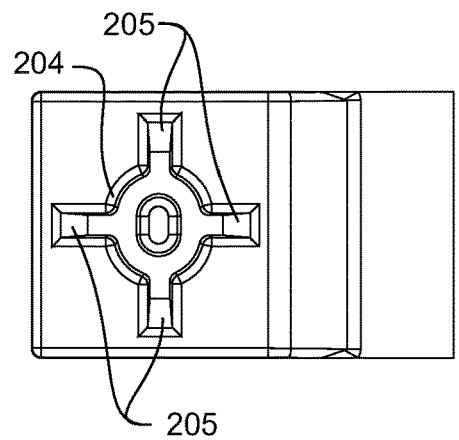
FIGURE 13D
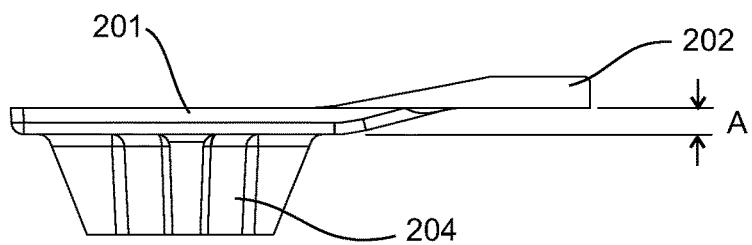
FIGURE 13E

ROOFING, CLADDING OR SIDING APPARATUS

CROSS-REFERENCE TO RELATED APPLICATIONS

This Application is a 371 National Stage Application of PCT/IB2015/059228, filed Dec. 1, 2015, which claims the benefit of U.S. Provisional Patent Application No. 62/086,017, filed on Dec. 1, 2014, the entire disclosures of which are hereby incorporated by reference for all purposes in their entirety as if fully set forth herein.

TECHNICAL FIELD

The present technology relates generally to roofing, cladding and/or siding products for providing a covering on a building surface.

BACKGROUND

A roofing, cladding or siding assembly typically forms a weather tight covering over a building surface such as a roofing underlay or roofing deck. A roofing cladding or siding assembly typically comprises many overlapping elements or modules such as shingles, tiles, panels, shakes, planks, boards, mouldings or sheets to form the weather tight covering. The individual roofing, cladding or siding modules are secured to the building surface, for example by adhesive or fasteners such as screws or nails.

Disadvantages of existing roofing, cladding or siding products may include issues such as:

Issues with weather tightness, particularly around areas where the roofing tile/shingle is fixed in place with screws/nails.

Issues with the fixing down of the front edge of the tile/shingle to avoid damage from wind lift in strong winds.

Issues arising from installations in environments where the thermal sealant fails to bond properly, for example low temperature environments or dusty/sandy environments.

Difficulties in replacing damaged tiles/shingles without also damaging the tiles/shingles that surround it.

Damage caused by the fitting and unfitting of duck boards (boards the installer stands on while carrying out the installation) during tile/shingle installation.

Issues with how to accommodate structures that protrude through the roof, e.g. chimneys, pipes etc.

Issues with structures attached to the roof and the resulting penetrations of the weather tight membrane e.g. solar cell installations, antennas.

Time to install and difficulties with installing on steep roof slopes and vertical walls.

It is therefore an object of the present invention to provide a roofing, cladding, or siding apparatus or roofing, cladding or siding components which will go at least some way towards addressing one or more of the foregoing problems or which will at least provide the public with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Further aspects and advantages of the present invention will become apparent from the ensuing description which is given by way of example only.

SUMMARY OF INVENTION

In a first aspect, the present invention consists in a roofing, cladding, or siding apparatus comprising:
a roofing, cladding, or siding module comprising:
an underlapping region and an exposed region, wherein the underlapping region is adapted to be substantially covered by the exposed region of an adjacent module when installed on a building surface;
an outer surface and an under surface,
a projection extending from the exposed region to provide a bearing surface facing the under surface of the exposed region,
one or more clips attachable to the underlapping region to provide a tongue adapted to be received between the bearing surface and the under surface of the exposed region of an adjacent overlapping module when installed on a building surface.

In some embodiments, the projection forms a groove between the projection and the under surface of the exposed region, the tongue of the clip adapted to be received in the groove of an adjacent overlapping module when installed on a building surface.

In some embodiments the projection extends rearward from the exposed region so that the groove is open to the rear of the module to receive the tongue of the clip when facing forwardly.

In some embodiments the projection extends from a front portion of the exposed region such that the groove is adjacent a front edge of the module, and the one or more clips attachable to a front portion of the underlapping region.

In some embodiments the clip comprises a fastening hole for receiving a fastener to secure the clip to the building surface.

In some embodiments the module comprises a fastening hole or marker to correspond with the fastening hole of the clip to receive a fastener through the clip and the module to secure the clip and the module to the building surface.

In some embodiments the fastener hole is suitably sized or comprises a burr or projection to hold a fastener within the hole to position the fastener for installation.

In some embodiments the clip comprises a base, the tongue extending from the base, and a fastener hole through the base for securing the clip and the module to the building surface.

In some embodiments the clip comprises a post extending from the base lateral to the tongue, and the module comprises a corresponding socket for receiving the post.

In some embodiments the fastener hole extends through the post to have a sufficient length to guide the fastener at a correct angle through the clip and the module, so that the fastener penetrates the module in a correct location.

In some embodiments the post is tapered and the socket correspondingly tapered to assist with locating the clip to the module.

In some embodiments the module comprises a recess for receiving the clip at the underlapping region.

In some embodiments sides of the recess bear against sides of the clip to set a position of the clip relative to the module.

In some embodiments the clip comprises a recess for receiving the head of a fastener and a seal between the head of the fastener and the clip.

In some embodiments the clip comprises a sealing surface and the underlapping region comprises a corresponding seat, the sealing surface of the clip adapted to form a substantially watertight seal with the seat.

In some embodiments the clip and the module are complementary adapted for the clip to rotate between an extended position wherein the tongue is received between the bearing surface and the under surface of the exposed region of an adjacent module and a retracted position wherein the tongue is withdrawn from between the bearing surface and the under surface of the exposed region of the adjacent module.

In some embodiments the clip comprises a post and the module comprises a corresponding socket for receiving the post, the clip rotating in the socket on an axis of the post between the retracted and extended positions.

In some embodiments the module comprises end stops for rotation of the clip between the retracted and extended positions, the end stops defining the retracted and extended positions of the clip.

In some embodiments the module comprises a recess for receiving the clip at the underlapping region, sides of the recess providing the end stops.

In some embodiments the clip is adapted to receive a tool to rotate the clip between the extended position and the retracted position.

In some embodiments the clip comprises a channel or opening or slot for receiving the tool to couple the tool to the clip.

In some embodiments the clip comprises a stop or shoulder for setting a depth of engagement of the tool with the clip.

In some embodiments the channel or opening or slot is positioned underneath the tongue of the clip to receive the tool from a front end of the clip.

In some embodiments the clip comprises a fastening hole for receiving a fastener for securing the clip and the module to the building surface, and wherein the clip rotates on an axis of the fastening hole or fastener extending through the hole.

In some embodiments the clip rotates from the retracted position to the extended position in a direction of rotation of a fastener when securing the module to a building surface.

In some embodiments the clip and module are adapted for an angle of rotation of the clip between the extended and retracted positions of less than 60 degrees.

In some embodiments the angle of rotation is about 45 to 50 degrees.

In some embodiments at least a portion of the front edge of the clip is angled or curved so that the distance from the centre of rotation of the clip to the front edge of the clip increases from a leading side of the clip along the front edge of the clip so that the front edge of the clip is withdrawn from between the bearing surface and the under surface of the exposed region when the clip is in the retracted position.

In some embodiments a leading corner of the clip is chamfered or rounded, the chamfer or radius of rounding in the range of 25% to 50% of the width of the clip.

In some embodiments the clip rotates about a centre of rotation by an angle of rotation from the retracted position to the extended position, and the distance from the centre of rotation of the clip to the front edge of the clip in a first direction for engaging the between the bearing surface and the under surface of the exposed region an overlapping module when in the extended position is greater than the distance from the centre of rotation of the clip to the front edge of the clip in a second direction for withdrawing from between the bearing surface and the under surface of the exposed region of the overlapping module when the clip is in the retracted position, the first and second directions diverging from the centre of rotation of the clip.

In some embodiments a portion of a front edge of the clip is at an angle to a remaining portion of the front edge of the clip, the angle substantially equal to or greater than the angle of rotation.

In some embodiments the module comprises a forwardly facing shoulder for running a tool along the shoulder to locate the clip when covered by an overlapping adjacent module.

In some embodiments the module comprises a projection over which the clip rides when moved from the retracted to the extended position, the projection positioned to retain the clip in the extended position.

In some embodiments, the projection forms a groove between the projection and the under surface of the exposed region, the tongue of the clip adapted to be received in the groove of an adjacent overlapping module when installed on a building surface, and when in the extended position at least a majority of a forward most part of the clip is positioned on an extended-position side of a line perpendicular to the groove of the module and extending through the centre of rotation of the clip.

In some embodiments, the module comprises a ramp surface or shoulder or a plurality of ramp surfaces or shoulders spaced apart along the length of the module and extending from the under surface of the module, and a corresponding shoulder or shoulders for bearing against the ramp surface or shoulder or plurality of ramp surfaces or shoulders extending from the under surface of an overlapping module.

In some embodiments, the ramp surface or shoulder or the plurality of ramp surfaces or shoulders spaced apart along the length of the module are located at or adjacent to a front edge of the under lapping region for locating the module to a rear edge of an under lapping module, the rear edge of the module providing the corresponding shoulder or shoulders for bearing against the ramp surface or shoulder or plurality of ramp surfaces or shoulders extending from the under surface of an overlapping module.

In some embodiments, the projection forms a groove between the projection and the under surface of the exposed region, the tongue of the clip adapted to be received in the groove of an adjacent overlapping module when installed on a building surface, and wherein a distance between the corresponding shoulder or shoulders and a front edge of the tongue of the clip when positioned to be received in the groove of an adjacent overlapping module is less than a distance between the ramp surface or shoulder or plurality of ramp surfaces or shoulders and a base of the groove, to provide a clearance between a front edge of the tongue and the base of the groove of an overlapping module In some embodiments, the projection forms a groove between the projection and the under surface of the exposed region, the tongue of the clip adapted to be received in the groove of an adjacent overlapping module when installed on a building surface, and wherein a distance between the rear edge of the module and a front edge of the tongue of the clip when positioned to be received in the groove of an adjacent overlapping module is less than a distance between the ramp surface or shoulder or plurality of ramp surfaces or shoulders and a base of the groove, to provide a clearance between a front edge of the tongue and the base of the groove of an overlapping module.

In some embodiments the clearance is in the range of 1 mm to 10 mm, or 1 mm to 8 mm, or 1 mm to 6 mm, or 2 mm to 5 mm, or about 3 mm.

In some embodiments the tongue engages with the groove by a depth in the range of 2 mm to 15 mm, or 2 mm to 10 mm, or 2 mm to 8 mm, or 2 mm to 6 mm, or 2 mm to 4 mm, or about 3 mm.

In some embodiments the upper surface of the exposed region comprises a photovoltaic cell or device.

In some embodiments the module is adapted for use as part of a thermal energy recovery system.

In some embodiments the module comprises one or more formed surfaces, wherein in the exposed region of the module the or each of the formed surfaces comprise three dimensional surface features to resemble shingles, asphalt shingles, slate, wooden shakes, thatch, tiles, or concrete tiles.

In some embodiments the module comprises a plurality of said formed surfaces and each formed surface is a segment along the length of the module.

In some embodiments the clip and the module are adapted for the clip to be fixed against movement about a fastener extending through the clip and module.

In some embodiments the module is moulded from one or more polymeric materials.

In some embodiments the module is manufactured by a continuous forming process, injection moulding, or compression moulding.

In some embodiments the module is pressed or otherwise formed from sheet metal.

In some embodiments the clip is positioned on the module to be completely covered by the exposed region of an overlapping module to be externally hidden from view.

In a second aspect, the present invention broadly consists in a roofing, cladding, or siding module comprising:
an underlapping region and an exposed region, wherein the underlapping region is adapted to be substantially covered by the exposed region of an adjacent module when installed on a building surface;
an outer surface and an under surface,
a projection extending from the exposed region to provide a bearing surface facing the under surface of the exposed region, and
one or more location details in the underlapping region each for receiving a clip comprising a tongue adapted to be received between the bearing surface and the under surface of the exposed region of an adjacent overlapping module when installed on a building surface.

In some embodiments the module of the second aspect of the present invention may comprise one or more features of the module described in any one or more of the above statements relating to the roofing, cladding, or siding apparatus of the first aspect of the present invention.

In a third aspect, the present invention broadly consists in a clip for securing a roofing, cladding or siding module comprising:
a base, a tongue extending from the base, and a fastener hole through the base for receiving a fastener to secure the clip and the module to the building surface, the tongue adapted to be received between a bearing surface and an under surface of the exposed region of an adjacent overlapping module to secure the overlapping module to the building surface.

In some embodiments the clip of the third aspect of the present invention may comprise one or more features of the clip described in any one or more of the above statements relating to the roofing, cladding, or siding apparatus of the first aspect of the present invention.

In some embodiments, the module is moulded from one or more polymeric materials. In some embodiments, the one or more polymeric materials are selected from the group consisting of polycarbonate, foamed polycarbonate, thermoplastic polyurethane (TPU), thermoplastic polyolefin (TPO), polyvinyl chloride (PVC), aquilobutalstyrene (ABS), styrene-acrylonitrile resin (SAN), thermoplastic rubber, and any other amorphous or crystalline polymer or combination of polymers. In some embodiments, the one or more polymeric materials are flame retardant. In some embodiments, the one or more polymeric materials are weather, hail, ultraviolet, tear, mold and impact resistant. In some embodiments the module is formed from metallic materials, for example steel. In some embodiments the module may be pressed and/or folded or otherwise formed from sheet metal. In some embodiments the module may be formed from pressed rubber, for example pressed recycled rubber (polymer) material.

In some embodiments, the module comprises at least two layers of polymeric material, wherein the layers are of the same or different polymeric material. In some embodiments, at least one material has high UV resistance. In one embodiment, at least one material has high thermal conductivity. In some embodiments, the module further comprises a reinforcement layer.

In some embodiments, the module or the polymer layers can be coloured or comprise a blend of colours. In some embodiments, the polymer on the outer layer of the module can be manufactured to mimic traditional roofing products. In some embodiments, the polymer on the outer layer of the module can be coloured to contrast with the colour of the photovoltaic (PV) cell layer to define an aesthetic feature, e.g. shadows.

In some embodiments, the upper surface of the underlapping region comprises channels configured to receive wires of a photovoltaic array. In some embodiments, the upper surface of the underlapping region comprises pockets or channels configured to receive printed circuit boards (PCB), communication devices, junction boxes, wires, buses, components, cells, and/or diodes of a photovoltaic array.

In some embodiments, the module is manufactured by a continuous forming process. In some embodiments, the module is continuously formed into a horizontal strip capable of extending substantially across an entire section or width of the building surface to be covered. In some embodiments, the module is continuously formed into a vertical strip capable of extending substantially down an entire section or length of the building surface to be covered. Alternatively in some embodiments the module is formed by injection moulding, die casting, extrusion, pressing, roll forming and folding, or any other suitable known forming process.

In another aspect, the present invention broadly consists in a roofing, cladding, or siding assembly comprising a plurality of roofing, cladding, or siding apparatus' as described in any one or more of the above statements, the roofing, cladding, or siding apparatus' providing a plurality of partially-overlapping modules that substantially covers a building surface.

In some embodiments the modules overlap down a fall of the building surface. In some embodiments, the modules overlap across a building surface. In some embodiments, each module is adapted to be fixably attached to the building surface by at least one fastening member. In some embodiments, at least one fastening member is a nail, staple or screw. In preferred embodiments, the roofing, cladding, or siding assembly forms a weather tight seal over the building surface.

In some embodiments, the dimension of the module in the direction that extends across the building surface is greater than the dimension of the module that extends down the building surface. In some embodiments, the dimension of the module in the direction that extends across the building surface is at least 2 times, or at least 3 times, or at least 4 times, or at least 5 times, or at least 10 times, or at least 15 times, or at least 20 times that of the dimension of the module that extends down the building surface. In some embodiments, the dimension of the module in the direction that extends down the building surface is at least 2 times, or at least 3 times, or at least 4 times, or at least 5 times, or at least 10 times, or at least 15 times, or at least 20 times that of the dimension of the module that extends across the building surface.

In a further aspect, the invention provides a roofing, cladding or siding assembly comprising or including a structure to provide a support surface, and a plurality of roofing, cladding, or siding apparatus' as described in any one or more of the above statements, the roofing, cladding, or siding apparatus' providing a plurality of partially-overlapping modules that substantially covers the support surface, the modules in an overlapping arrangement down the fall or pitch of the support surface, thereby to define the exterior fall or pitch of the roofing, cladding or siding assembly.

In a further aspect, the invention provides the use of a roofing, cladding or siding assembly as herein described to either or simultaneously: (a) generate electrical output from PV devices; and/or (b) heat an induced or other air flow by heat exchange from at least some of the modules as a consequence of heating of the modules by received sunlight or heating of the modules as a consequence of the effect of received sunlight on the PV devices, or both.

In a further aspect, the invention provides a roof clad by roofing components of any aspect of the present invention.

In a further aspect, the invention provides a building surface clad by cladding or siding components of any aspect of the present invention.

Unless otherwise stated, the singular forms "a," "an," and "the" include the plural reference. For example, a reference to "a device" includes a plurality of devices.

As used herein the term "and/or" means "and" or "or", or both.

As used herein "(s)" following a noun means the plural and/or singular forms of the noun.

Relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if a device or apparatus in one of the figures is turned over, elements described as being on the "lower" side of other elements would then be oriented on "upper" sides of the other elements. The exemplary term "lower", therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, the term "building surface" refers to a wall surface or a top surface, etc. of a building, e.g. an exterior wall, a roof, a ceiling, etc., unless otherwise specified. In the context of a roof, the building surface typically comprises a waterproof roofing membrane attached to the roof deck adjacent an eave of the roof for preventing water damage to the roof deck and an interior of a building from wind-blown rain or water buildup on the roof. The roof deck is typically made of an underlying material, such as plywood. The waterproof membrane may be any of a number of waterproof roofing membranes known in the art such as but not limited to bituminous waterproof membranes, modified bituminous roofing membranes, self-adhering roofing membranes, or single ply waterproofing roofing membranes (e.g. EPDM waterproof roofing membranes, PVC waterproof roofing membranes, TPO waterproof roofing membranes). One exemplary membrane sheet is Deck-Armor™ Roof Protection, manufactured by GAF Corp., Wayne, N.J.

As used herein, the term "roofing" means a protective covering on the roof surface of a building. Without limitation, such a protective covering might take the form of shingles, tiles, panels, shakes, planks, boards, mouldings or sheets.

As used herein, the terms "cladding" and/or "siding" mean a protective covering on a side or other surface of a building. Without limitation, such a protective covering might take the form of shingles, tiles, panels, shakes, planks, boards, mouldings or sheets.

Without limitation a roofing, cladding and/or siding module that forms part of a roofing cladding or siding of a building may comprise one or more shingles, tiles, panels, shakes, planks, boards, mouldings or sheets or a portion of one of these. For example in some embodiments a cladding or siding module may be a weather board, and a roofing module may be a tile or shingle. In preferred embodiments a roofing, cladding or siding module is moulded from a polymeric material or materials (which may be in layers). Each moulded polymeric module preferably comprises a plurality of three dimensional profiled surfaces joined without weld lines or injection moulding points. Each profiled surface is a moulded segment along the length of the module. In some embodiments, each formed segment may correspond to an individual die or mold of a continuous forming machine. In other embodiments a roofing, cladding or siding module is formed from metal, for example by pressing and/or folding from sheet metal. Each formed module preferably comprises a plurality of three dimensional profiled surfaces, each profiled surface pressed or folded or otherwise formed from a single sheet of metal material such as steel.

As used herein, the terms "profiled" and/or "contoured" mean having a region, or regions which extend above or below a notional planar surface lying along the longitudinal axis of the product. This includes profiling or contouring of only one upper or lower surface, and/or profiling or contouring of an entire thickness of material such that the upper and lower surfaces have the same relative degree of extension above or below the notional planar surface.

As used herein, the term "polymer" (and associated terms such as "polymeric") includes polymers, polymer blends, and polymers with or without additive inclusions.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

FIG. 7B shows the recess and socket in plan view.

FIGS. 9A to 9E illustrate in various views an alternative clip according to some embodiments of the present invention.

FIGS. 13A to 13E illustrate in various views an alternative clip according to some embodiments of the present invention.

DETAILED DESCRIPTION

Figure 1:
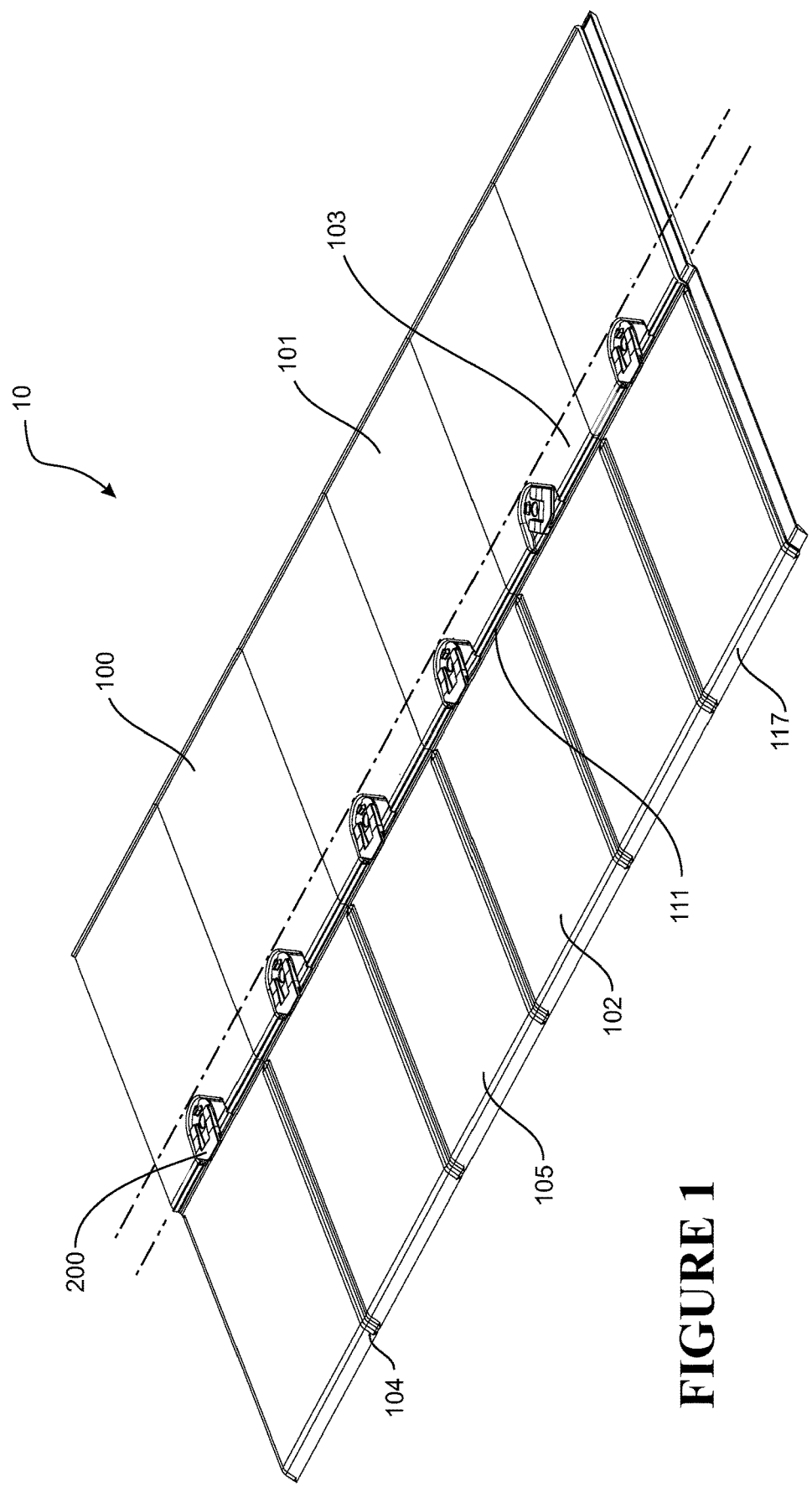
FIG. 1 shows an illustrative embodiment of a continuously formed roofing, cladding or siding apparatus in its basic form. The apparatus comprises a roofing module and clips for securing an adjacent overlapping module.

The present technology relates to a cladding, siding or roofing product or apparatus (herein called apparatus). A cladding, siding or roofing apparatus provides for a protective covering on the roof surface or a wall surface or other surface of a building.

A cladding, siding or roofing apparatus according to the present invention comprises a cladding, siding or roofing module and one or more clips for securing a portion of an adjacent overlapping module.

A roofing, cladding and/or siding module may comprise one or more shingles, tiles, panels, shakes, planks, boards, mouldings or sheets or a portion of one of these. In some preferred embodiments the module of a roofing, cladding and/or siding apparatus of the present invention is moulded from a polymeric material or materials (which may be in layers) to have a plurality of formed surfaces. Each of the formed surfaces may comprise three dimensional surface features, the formed surfaces joined without weld lines or injection moulding points. Each formed surface is a moulded segment along the length of the module. In some embodiments, each formed segment may correspond to an individual die or mold of a continuous forming machine, for example as described in PCT/NZ2006/000300 (published as WO2007/058548). Use of the term "joined" in this context is not intended to require that each of the formed surfaces of a module were ever separated, i.e., the formed surfaces may be integrally formed together in situ during the manufacturing process. Alternatively the module design features may be achieved by thermoforming, pressing, or other method of forming, either continuously or discontinuously wood, metal, concrete, resins, glass, clay, composites or the like. For example, in some embodiments the module may be pressed and/or folded or otherwise formed from sheet metal, or may be formed from pressed rubber, for example pressed recycled rubber material.

In some embodiments the module may be manufactured in long strips by a continuous process which incorporates a continuous forming step, and therefore can be made in varying lengths as required depending on the required coverage area. A single moulded module, capable of extending across the entire width or section of the roof or building to be protected, may be manufactured. For example, the modules may be very much greater in dimension across the building surface to be covered than the dimension it will cover down the building surface. In some embodiments, the dimension of the module in the direction that extends across the building surface is at least 2 times, or at least 3 times, or at least 4 times, or at least 5 times, or at least 10 times, or at least 15 times, or at least 20 times that of the dimension of the module that extends down the building surface.

Alternatively, the modules may be very much greater in dimension down the building surface to be covered than the dimension it will cover across the building surface. In one embodiment, the dimension of the module in the direction that extends down the building surface is at least 2 times, or at least 3 times, or at least 4 times, or at least 5 times, or at least 10 times, or at least 15 times, or at least 20 times that of the dimension of the module that extends across the building surface.

In some embodiments, the modules may be about 0.2-1 m in length, 1-20 metres in length, about 3-10 metres in length, or about 4-8 metres in length, or 2-4 metres in length. In a continuous forming manufacturing process modules of 4-5 metres in length, and modules of 8 metres in length may be suitable manufacturing sizes, but the manufacturing process may allow custom lengths to be accommodated just as easily. A plurality of such modules can then be arranged in lapping rows down the surface of the structure.

Example roofing, cladding and/or siding modules and manufacture of such modules by a continuous forming process are described in WO2013/081477. However, as described above, a roofing cladding or siding module of the present invention may simply be a tile or shingle or sheet material or other known roofing, cladding or siding element, for example a pressed or folded sheet metal tile.

An illustrative embodiment of a roofing apparatus 10 is shown in FIG. 1. There is a module 100 having an underlapping region 101, and an exposed region 102 (i.e. to be exposed when a series of modules are positioned in a lapping arrangement). There is also a fixing region 103 where the module 100 is to be attached to the building surface. In FIG. 1 the fixing region 103 is indicated by boundary discontinuous lines running across the width of the module 100. The fixing region is within the underlapping region 101. The fixing region may be at or adjacent to a front edge of the underlapping region.

The fixing region may be adjacent to a rear edge of the overlapping region. The fixing region may be a region of the underlapping region adjacent to a rear edge of the overlapping region. The regions may exist in various proportions comparative to each other, and there may be profiling or contouring 104 of any or all regions in a continuous or discontinuous pattern along the length of the module 100. In some embodiments, the width (the distance the region extends down the building surface) of the underlapping region 101 approximately equals the width of the overlapping region 102. In other embodiments, the width of the underlapping region 101 is about 95%, about 90%, about 80%, about 75%, about 60%, about 50%, about 40%, about 30%, about 25%, about 15%, or about 10% of the width of the overlapping region 102. In some embodiments, the overlapping region 102 is from about 5 cm to about 60 cm wide and the underlapping region 101 is from about 5 cm to about 60 cm wide. In some embodiments, the width of the under lapping region 101 is greater than the width of the overlapping region 102, in which case a front portion of the under lapping region overlaps a rear portion of the under lapping region of an adjacent under lying module.

Figure 2:
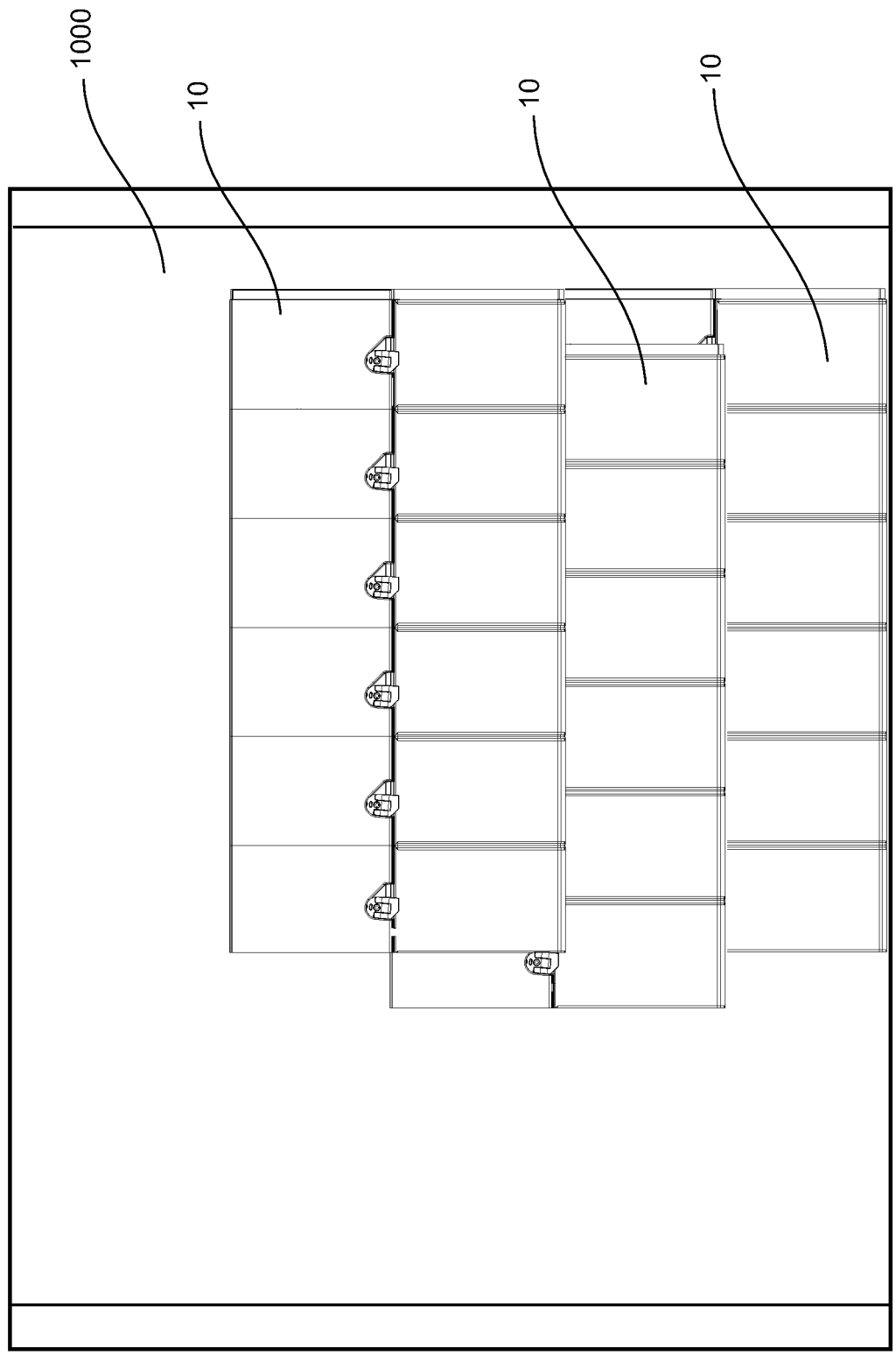
FIG. 2 shows a series of modules fixed in a lapping arrangement with offset vertical alignment for added visual appeal.

Variations in the profiling or contouring can be used to create different stylistic or ornamental effects in the exposed region. For example, the module may be formed with a sinusoidal profile to simulate concrete tiling; an angular profile to simulate weatherboarding; with relief features on its upper surface to simulate asphalt shingles; or with a variable upper surface contour to simulate slate tiling or wooden shakes. In FIG. 1, the exposed region comprises profiling 104 to simulate individual tiles or (asphalt) shingles or slate positioned side-by-side. Overlapping and underlapping adjacent modules (for example as illustrated in FIG. 2) may be offset vertically to give the appearance of a traditional tiled or slate or shingle roof as shown in FIG. 2. As shown, a plurality of modules are laid horizontally across a building surface and lapped vertically down that surface. However, in some embodiments modules may be laid vertically down a building surface and lapped across the building surface.

The module may be formed with a convex precamber to apply a pre-load pressure to encourage the edges and bottom surface of the overlapping modules to contact firmly onto the adjacent underlapping modules when installed on a building. Convex precamber means the module is curved to have a convex upper surface and concave undersurface so that when lying on a surface the edges of the module make contact with the surface before a central region of the module. When the centre region of the module is pressed flat against the surface the edges of the module are pre-loaded against the surface.

Each module may be fixed to a building surface such as a roof surface by fasteners (nail or screw for example) applied through the module in the underlapping region or fixing region of the module. Preferably the fasteners are applied through the underlapping region so that the fasteners do not penetrate the exposed overlapping region of the module, thereby making the roofing, cladding or siding apparatus less likely to leak. In some embodiments the underlapping region may be pre-formed with fastener holes or may include markings for locating or supporting fasteners for penetrating the module.

Preferably the exposed region of the module is also secured to the building surface to ensure the module is properly secured to the building. Preferably a front edge or front edge portion of the exposed region is secured to the building surface to prevent damage to the module caused by wind lifting a front edge of the module off or away from an underlying module.

To secure the exposed region of the module to a building surface, the roofing, cladding or siding apparatus according to the present invention comprises one or more clips. Each clip secures the exposed region of an adjacent overlapping module to the underlapping module. As the underlapping module is secured to the building surface, the exposed region of the overlapping module is secured to the building surface via the underlapping module. In some embodiments, the clip is secured to the building surface by a fastener extending through an underlapping module, the exposed region of an overlapping module secured to the building surface by the clip and fastener extending through the underlapping module.

Figure 11:
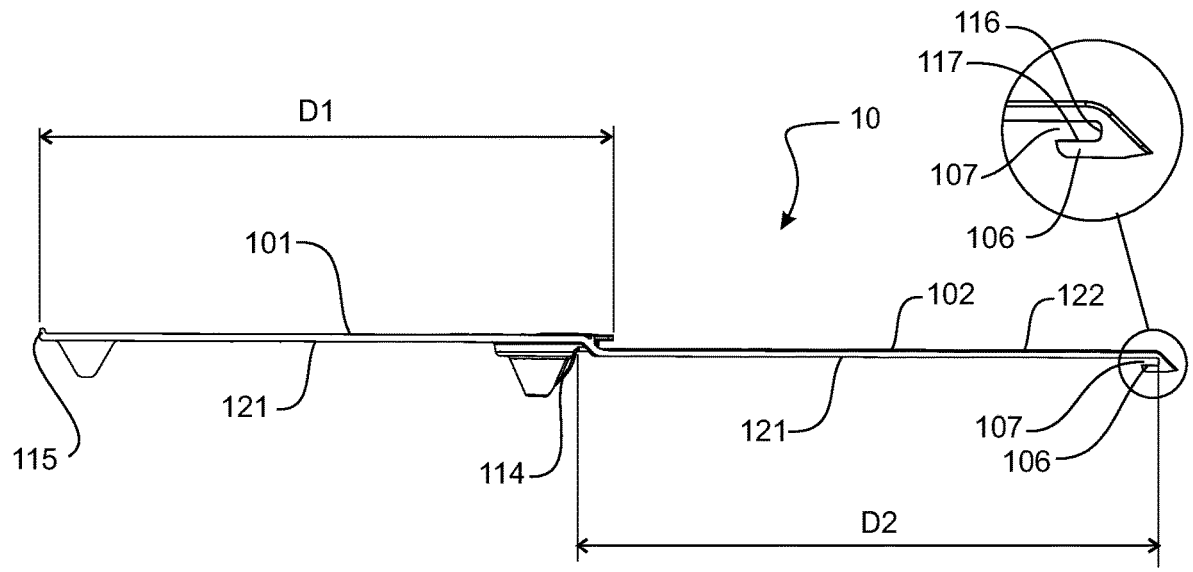
FIG. 11 is a side view of the roofing, cladding or siding apparatus of FIG. 1.

As shown in FIG. 1, each clip 200 provides a tongue 202 (FIGS. 3 to 6) to be received in a corresponding groove of the exposed region of an adjacent overlapping module. As shown in FIG. 11, in some embodiments the module comprises a projection or lip 106 extending rearward from the under surface 121 of the exposed region 102. The lip 106 provides a grove or channel 107 between the lip 106 and the under surface 121 of the exposed region. In some embodiments the groove or channel is open to the rear of the module for receiving the forwardly extending tongue of a clip 200. The grove or channel 107 runs parallel to the front edge of the module. The projection 106 provides a bearing surface 117 facing the undersurface of the exposed region. When the tongue of a clip 200 attached to an under lapping module is received in between the bearing surface 117 and the under surface of the exposed region of an adjacent overlapping module, if the overlapping module is lifted away from the under lapping module the clip contacts the bearing surface to retain the overlapping module in place.

In some embodiments the projection for providing a bearing surface facing the under surface of the module is 'U-shaped' when viewed from the front or rear of the module, such that the projection provides a space between the projection and the under surface that is open to both the front and rear of the module. In this embodiment the projection provides a groove between the projection and the under surface of the module that is open to the front and rear of the module.

In preferred embodiments clips 200 are provided to secure a front edge or front portion 105 of an overlapping module to an underlying module. For example, as shown in FIG. 11, the lip extends from a front edge or front region of the module so that the grove is located adjacent the front edge of the module. In FIG. 1 a plurality of clips 200 are provided to a forward region 103 of the under lapping region for engaging a groove 107 at or adjacent to a front edge of an overlapping adjacent module. In some embodiments the upper surface comprises a step or forward facing shoulder 111 at the fixing region. With the clip fixed to the module in the fixing region, the tongue of the clip overhangs the step 111 so that the tongue is spaced off the upper surface of the module to be received in the groove of the exposed region of the adjacent overlapping module.

The roofing module of FIG. 1 by example comprises six clips spaced along the length of the module. An apparatus according to the present invention may have more or less clips depending on the coverage area of the module and other factors such as rigidity of the module material. For example, in embodiments where the module is a single tile or shingle having a width or length of for example 20 cm to 45 cm, the apparatus may comprise a single clip or two clips for securing to an overlapping module or modules. Also, the number of clips may be varied depending on expected wind loading. For example, a module may be adapted to receive a maximum number of clips, and depending on environmental conditions, that module may be fitted with the maximum number of clips to accommodate extreme weather conditions, or a lesser number of clips to suit less extreme weather conditions When installing a roofing, cladding or siding assembly to a building surface, a number of modules may be arranged side-by-side across the building surface (or a single continuous module may be laid across the building surface) and fixed to the building surface via fasteners extending through the under lapping region of the modules. For a next course of modules to be applied to the building surface each module of the next course may be initially engaged with the previous course or row of modules by engaging the groove of the exposed region to the clips fitted to the modules of the previous course or row. For example, an installer may place each new module to be installed over the module of a previous course and push with his or her foot (e.g. kick) the front edge of the module to fit the clips fixed to the underlapping module into the groove of the newly fitted overlapping module. With the clips of the underlapping module engaged with the groove of the overlapping module, the overlapping module may then be secured to the building surface using fasteners extending through the underlapping region of the overlapping module to complete installation of the newly applied course or row of modules.

Preferably the clip is provided near to or at the fixing region of the module or adjacent to fasteners securing the underlapping module to the building surface so that the clip secures the exposed region of the overlapping module at or near to where the underlapping module is secured to the building surface.

In preferred embodiments the clip comprises a fastening hole for receiving a fastener. Preferably the module comprises a location detail for locating the clip to the module. For example, the module preferably comprises a corresponding fastening hole or marker to correspond with the fastening hole of the clip. When securing a module to the building surface a fastener is provided through the clip and the module to secure the clip to the module and the clip and the module to the building surface. In some embodiments the fastening hole of the clip may be adapted to retain a fastener in a correct position for passing through the module. For example the clip fastening hole may comprise a burr or other feature or projection or is of sufficient diameter so that the fixing body of a fastener (e.g. the threaded shaft of a screw) cannot drop through the fastening hole. The fastener for example a screw may be threaded into the fastener hole of the clip to a correct depth, for example so that the fastener does not extend fully through the clip. The fastener may be provided pre-installed in the clip so that an installer may hold the clip in place on the module with one hand and using a tool thread the fastener through the clip and module and into the building surface with the other hand.

Three example clips are illustrated in FIGS. 8A to 8E, 9A to 9E and 13A to 13E. Each clip comprises a base 201, a tongue 202 extending from the base for engaging the groove of an overlapping module, and a fastening hole 203 through the base for securing the clip to the module and building surface. In some embodiments, as shown in FIGS. 13A to 13E, the clip may also comprise a post 204 extending from the base lateral to the tongue 202. In preferred embodiments the fastening hole 203 of the clip extends through the base 201 and post 204 of the clip. As described above, the fastening hole 203 may be suitably sized or may comprise a burr or projection 214 (for example a flat in the side of the hole 203) to retain the fastener in the hole at a suitable depth (e.g. a leading point of the fastener positioned within the hole 203 extending through the post 204) to then be driven through the module and into the building surface. Preferably the fastener hole 203 is of a sufficient length to guide the fastener at a correct angle through the clip and the module, so that the fastener penetrates the module in a correct location. In some embodiments the fastener hole has a length of about 1 cm to 2 cm to guide the fastener at the correct angle through the clip and module.

Figure 7A:
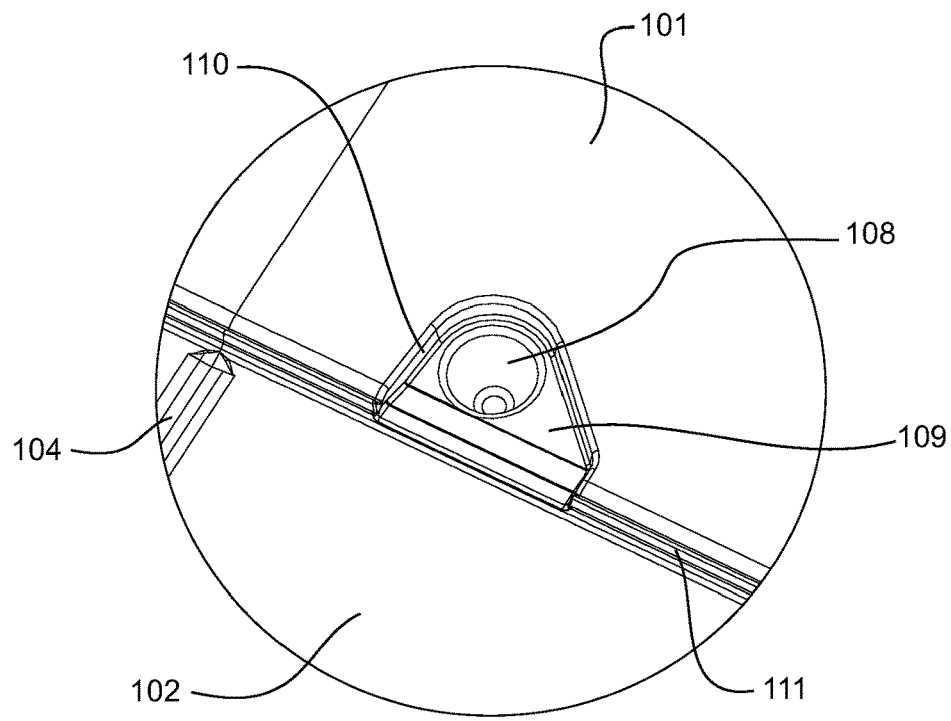
FIGS. 7A and 7B show a recess and socket of the module of the apparatus of FIG. 1 for receiving a clip as illustrated in FIG. 5.
Figure 7B:
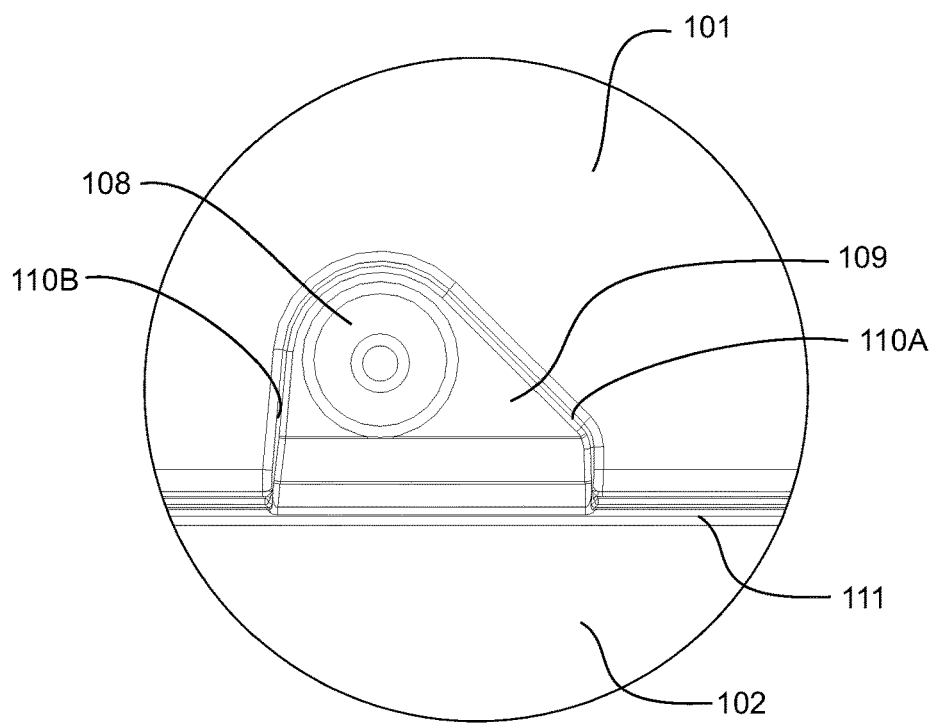
Figure 7C:
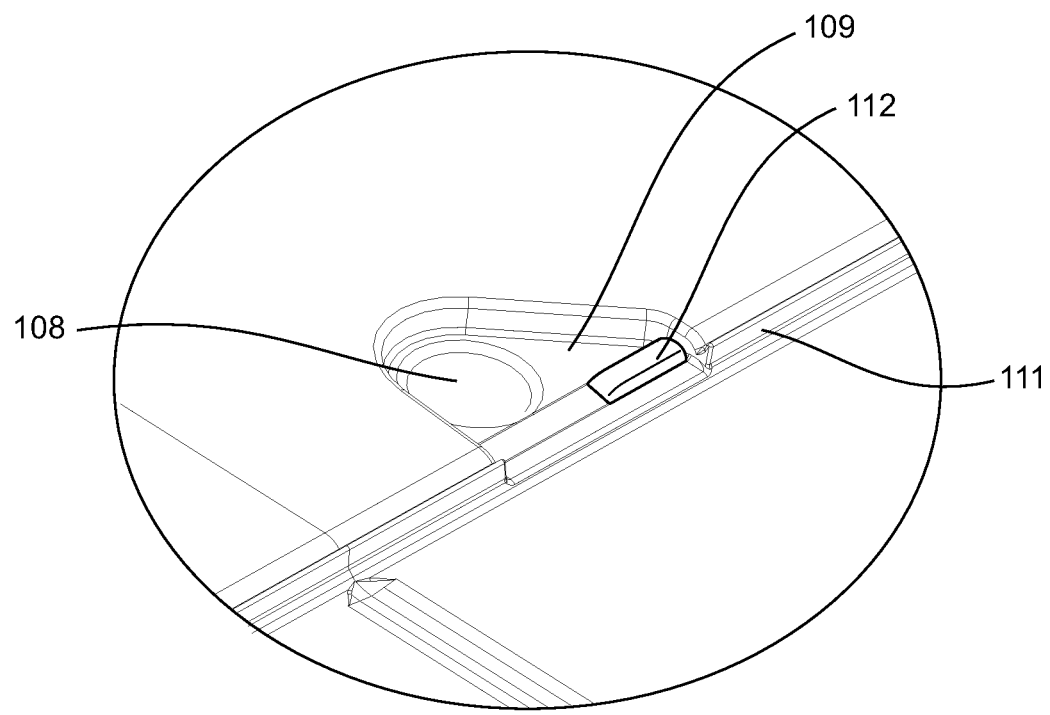
FIG. 7C shows an alternative recess and socket comprising a projection to assist with retaining a clip in the extended position.

In embodiments comprising a clip having a post 204, the module comprises a corresponding socket for receiving the post. For example, an example socket 108 is illustrated in FIGS. 7A to 7C. In use, the post of the clip is inserted into the socket of the module to correctly locate and position the clip to the module. In some embodiments or in use the clips may be fitted to or installed in the sockets prior to positioning the module on the building surface. In preferred embodiments the post may have tapered surfaces 205 or a tapered surface and the socket 108 being correspondingly tapered, to assist with location of the clip to the module. For example, the post may be conical or frusto-conical, or have surfaces 205 that are conically coterminous. The socket may prevent lateral movement of the clip relative to the module, as sides of the post may bear on sides of the socket.

Figure 8A:
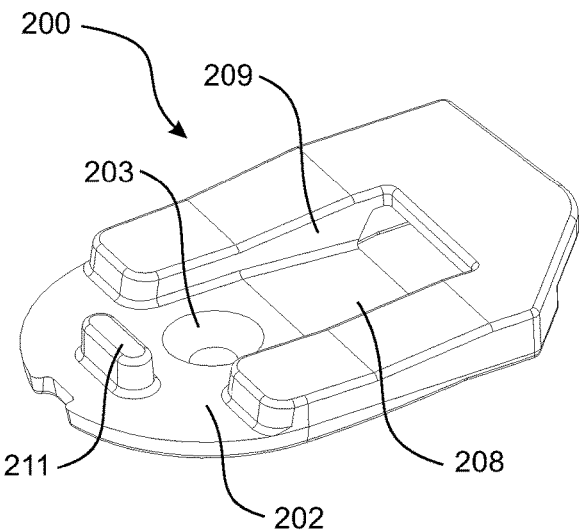
FIGS. 8A to 8E illustrate in various views a clip according to some embodiments of the present invention.
Figure 8B:
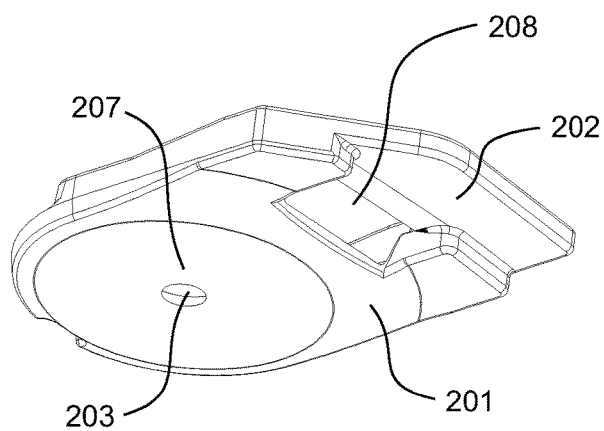
Figure 8C:
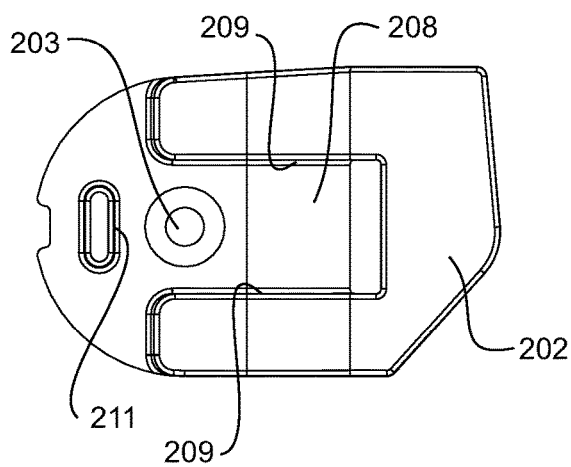
Figure 8D:
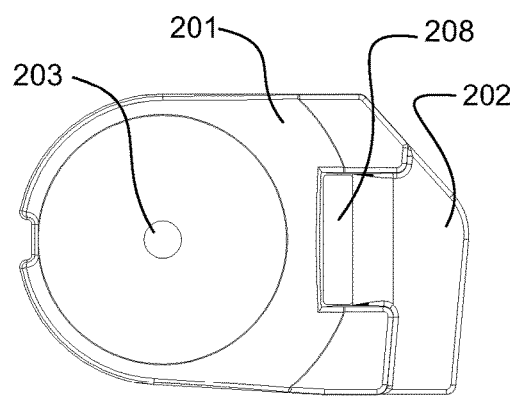
Figure 8E:
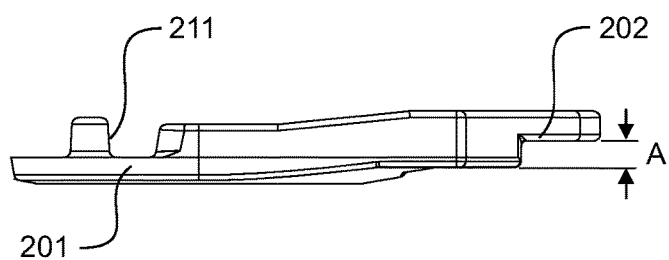
Figure 9E:
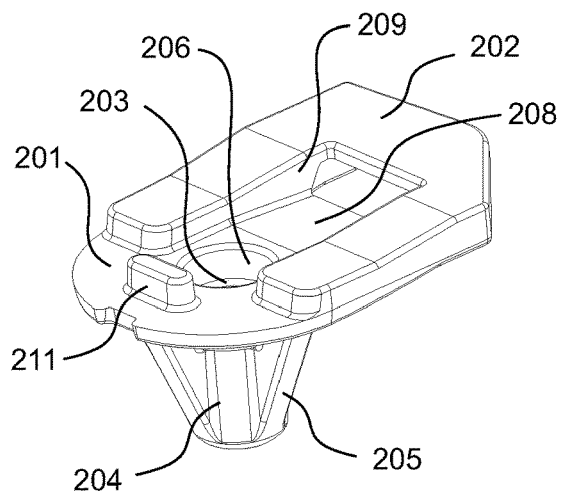
Figure 9E:
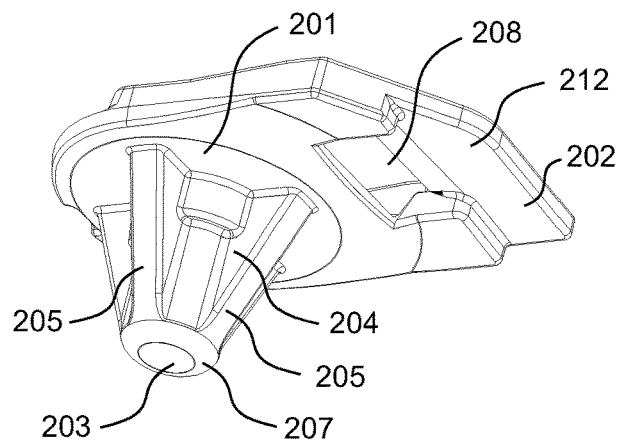
Figure 9E:
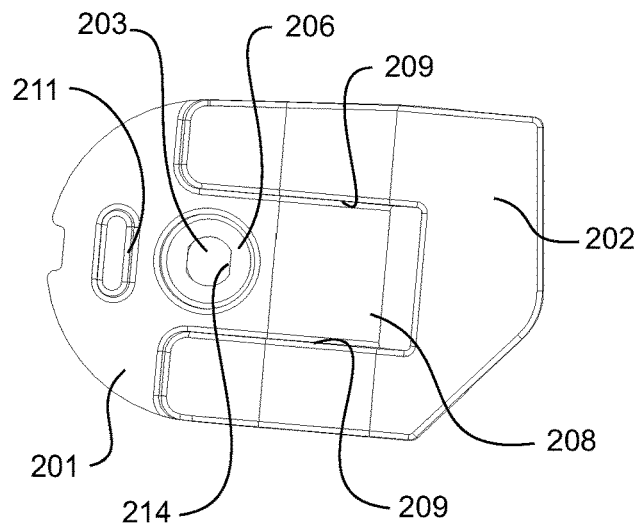
Figure 9E:
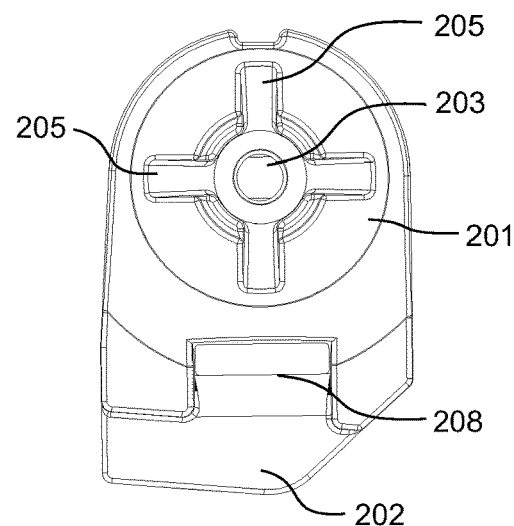
Figure 9E:
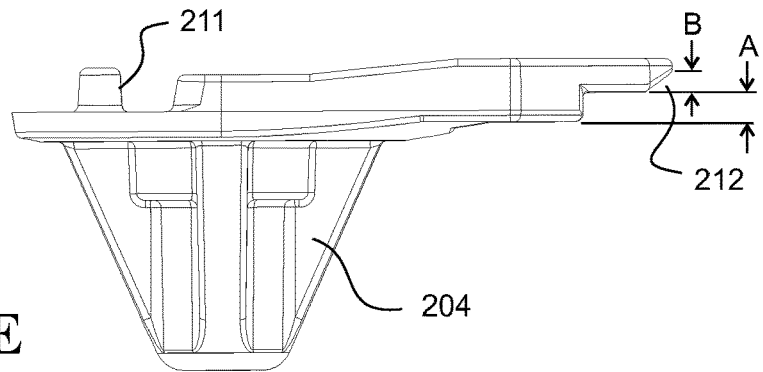

In some embodiments in addition or alternatively to the socket the module may comprise a recess 109 for receiving and/or positioning the clip to the module, for example as shown in FIGS. 7A and 7B. For example sides 110 of the recess may bear against sides of the base of the clip to set a position of the clip to the module. The tongue of the clip extends from the recess to engage with the groove of the overlapping module. The tongue may be vertically off set from the base. For example as shown in FIGS. 8E, 9E and 13E the tongue is offset from the base by vertical distance "A".

When installed a fastener extends through the underlapping region of the module. Where a fastener extends through both the clip and module, in some embodiments the clip may provide a seal or assist in providing a watertight seal between the fastener and the clip and/or between clip and the module, to prevent or reduce water passing from an upper surface of the module through the hole in the module formed by or receiving the fastener. In some embodiments, the clip comprises a recess (206 FIGS. 9A and 9C) for receiving the head of a fastener and a seal member (for example an elastomeric member such as an o-ring or annular elastomeric gasket) to be positioned between the head of the fastener and the clip. The clip recess 206 forms an annular seal groove between outer wall of the recess and an outer surface of the fastener to ensure the seal is captured laterally and is not spread or twisted or otherwise deformed excessively from under the head of the fastener. Also, the recess ensures the screw does not contact the underside of an overlapping module, or contact a tool (described below). In some embodiments the clip may also comprise a sealing surface to seal against a corresponding seat of the underlapping region of the module. For example, with reference to FIG. 8B, an underside of the clip 200 comprises a sealing surface 207. Surface 207 is forced against a corresponding surface or seat of the module to form or assist with forming a watertight seal. Preferably a seal between the fastener and the clip combined with a seal formed between the clip and the module substantially prevents water passing through the fastener hole of the module. Additionally, any water that does reach the clip is minimal as the clip and fastener are provided in the underlapping region of the module and thus are protected from weather elements by the exposed region of an overlapping module. The sealing surface of the clip is provided around the fastening hole of the clip. In some embodiments the sealing surface comprises an area covered by a head of the fastener.

In some embodiments the sealing surface provided by the clip and the corresponding seat or sealing surface of the module have a relatively small area so that force provided by the fastener extending through the module and clip and into the building surface provides a relatively high contact pressure between the clip and module. Preferably the sealing surface of the clip is an annular area surrounding the fastener hole. Preferably the sealing surface has an area of less than 60 mm².

In the embodiment of FIGS. 13A to 13E the clip and module are adapted so that the clip remains in a fixed position at the module with the module and clip secured to the building surface (for example the clip located in a correspondingly shaped recess in the module to fix the clip against movement about the fastener extending through the clip and module). In some embodiments, such as the embodiments of FIGS. 8A and 9A, the clip is adapted to be rotated between an extended position wherein the tongue engages the groove of an adjacent module and a retracted position wherein the tongue is clear of the groove of the adjacent module.

Figure 3:
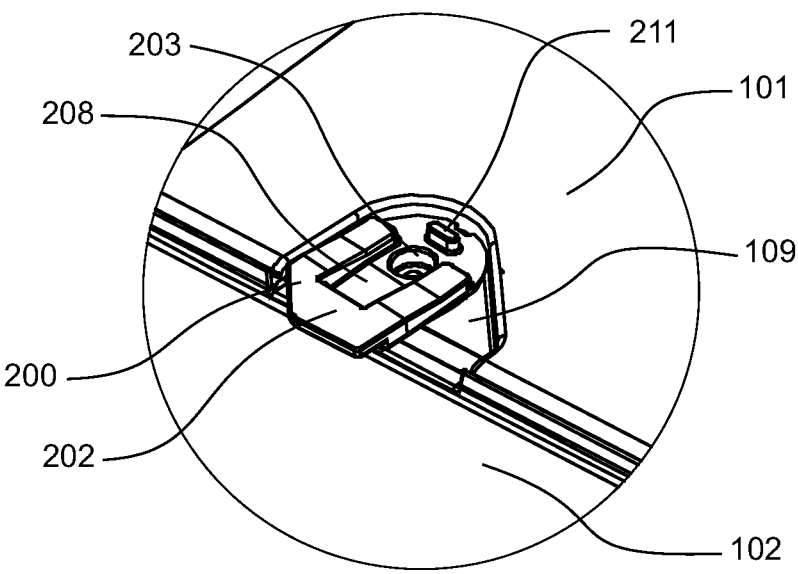
FIG. 3 shows a clip of the apparatus of FIG. 1 in an extended position.
Figure 4A:
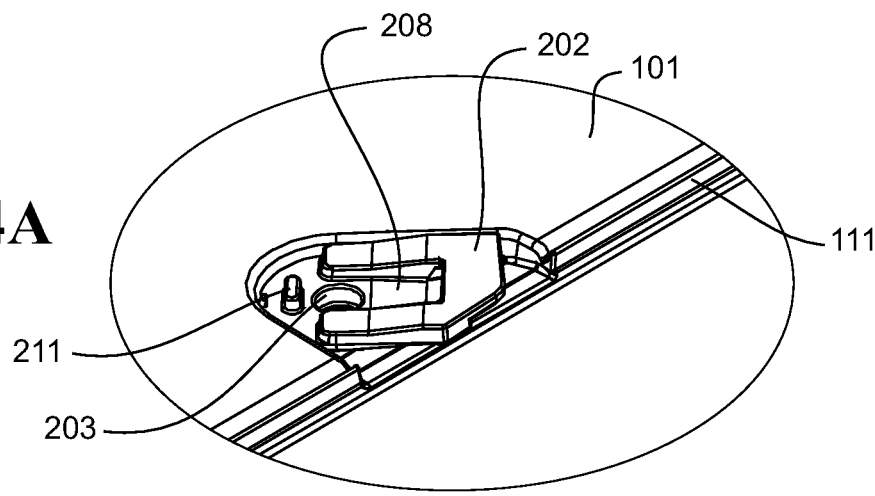
FIGS. 4A and 4B show a clip of the apparatus of FIG. 1 in a retracted position.
Figure 4B:
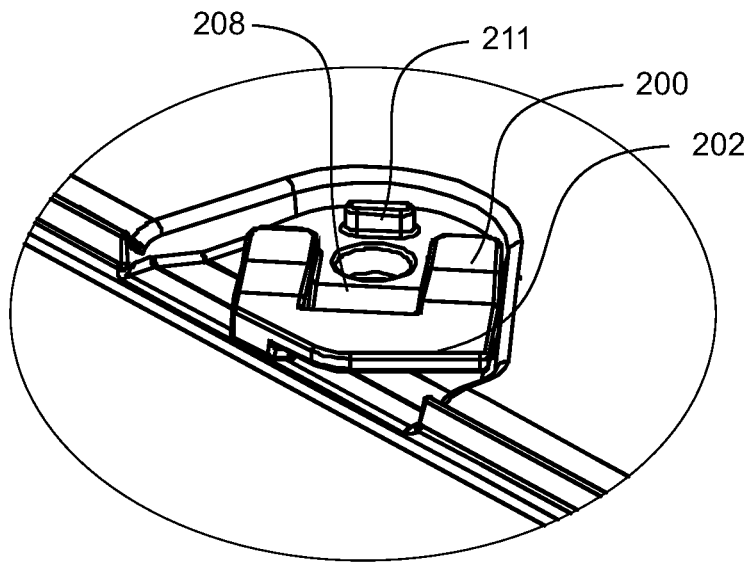

In FIG. 1, a roofing, siding or cladding apparatus is shown with six clips 200. One of the clips is shown in a retracted position, and the other five clips are shown in an extended position for engaging the groove of an adjacent overlapping module. In FIG. 3, a clip 200 is illustrated in the extended position. FIGS. 4A and 4B illustrate a clip 200 in the retracted position.

In some embodiments the module comprises end stops or projections for defining the range of rotation between the extended and retracted positions of the clip. In embodiments where the clip is located within a recess 109, in some embodiments the recess 109 is shaped and sized to allow the clip to rotate between the retracted and extended positions. For example, a side 110A (FIG. 7B) of the recess may bear against a side of the clip when the clip is in the retracted position, and an opposite side 110B of the recess may bear against an opposite side of the clip when in the extended position. The sides of the recess define end stops for the rotation of the clip between the retracted and extended positions. The sides of the recess define the retracted and extended positions of the clip. In some embodiments the recess comprises an open front for the tongue to extend when in the extended position. In some embodiments an upper surface of the underlapping region of the module is stepped upwardly from an upper surface of the exposed region so that the tongue of the clip is spaced from the upper surface of the exposed portion.

Figure 10:
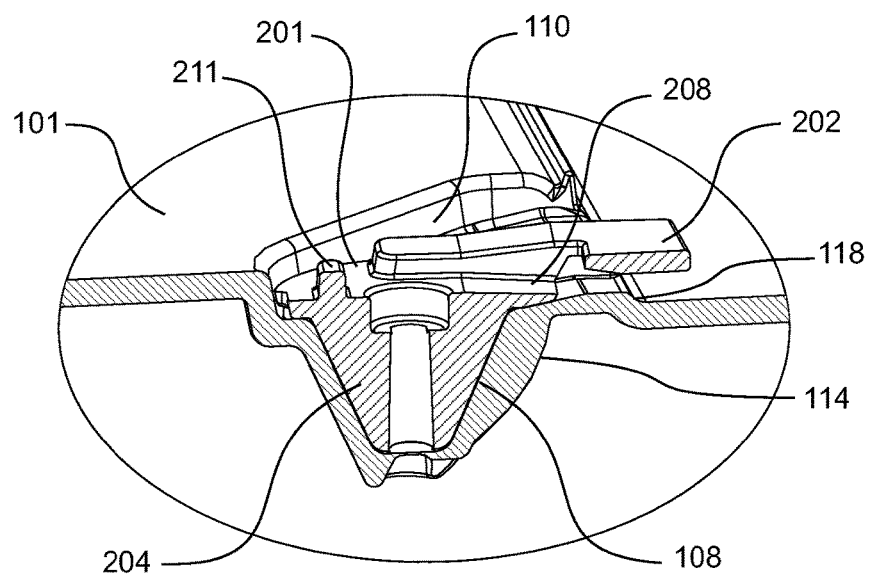
FIG. 10 is a cross section of the clip of FIG. 8A installed in the socket and recess of FIG. 7A.

In embodiments where the clip rotates between the retracted and extended positions, preferably the clip comprises a post 204 or projection as shown in FIGS. 9A to 9E, and the module comprises a corresponding socket 108 as described earlier, and the clip rotates on the post located within the socket, for example refer to FIG. 10. The clip rotates on an axis of the post and the socket with the clip located at the module. The post and socket define a rotation axis on which the clip rotates between the retracted and extended positions.

In some embodiments, with the clip in the retracted position the clip including the tongue of the clip is located within the recess. As the clip rotates from the retracted position to the extended position the tongue extends from the recess to engage the groove of an adjacent overlapping module. As the clip is rotated from the retracted position to the extended position the tongue gradually engages the groove of the adjacent overlapping module and is fully engaged with the groove when in the extended position.

Rotation of the clip allows for a module to be removed from a building surface, for example for replacement of a damaged module, without a requirement to remove other adjacent or neighbouring modules. To remove a module such as a tile or shingle from a building surface, the clip or clips of the module may be rotated out of engagement with the exposed region of an adjacent overlapping module. The exposed region of the overlapping module may be lifted off or away from the under lapping region of the module to expose the fasteners securing the module to the building surface. The fasteners may be removed from the module and building surface, for example by using a straight or right-angled screw driver/drill to detach the module from the building surface. The module may then be slid off the tongues of the clips retaining the exposed region of the module from an adjacent under lapping module. Alternatively, the clips of the under lapping module could also be rotated, to disengage from the exposed region of the module being removed. A new replacement module may be inserted into the space in the roofing, siding or cladding of the building left vacant by the removed module. To insert the new module, the under lapping region of the new module may be inserted under the exposed region of the adjacent overlapping module. The new module is fitted so that the clips of an under lapping module or modules engage the groove of the new module. Once the new module is in position, access to the clips and fasteners for securing the new module to the building surface is gained by lifting the exposed region of the adjacent overlapping module. Once the new module is fastened to the building surface by fasteners through the under lapping region, the exposed region of the overlapping module is laid flat against the new module and the clips of the new module are rotated from the retracted position to the extended position to engage the groove of the overlapping region to complete the installation of the new module.

In some embodiments the clip is adapted to receive a tool to rotate the clip from the extended position and the retracted position. For example, as illustrated in the embodiments of FIGS. 8A to 8E and 9A to 9E, the clip may comprise a channel or opening or slot 208 for receiving the tool to couple the tool to the clip. The channel or opening or slot (e.g. a socket) is positioned below the tongue 202 of the clip. The slot or channel or opening 208 is accessible below the tongue of the clip. In some embodiments the slot or channel or opening 208 is open to or accessible from a front of the clip. Preferably the channel or slot or opening 208 is accessible between the upper surface of the module and the bottom of the lip of an overlapping module. Preferably the tool comprises a relatively thin section to access the clip between the upper surface of the exposed region of the module and the undersurface of an overlapping module. A proprietary tool may be provided with a thin member for engaging the slot or opening or channel 208 of the clip. In some embodiments the slot or opening or channel is sized and shaped to receive an end of a standard hacksaw blade. Hacksaw blades are cheap and easily accessible and have a thin section to allow the blade to reach a clip between the upper surface o an under laying module and the undersurface of an overlaying module. Also, a hacksaw blade is flexible in a transverse direction to the blade and so can be flexed between the lapping modules to reach the covered clip, and also a portion of the blade extending over the exposed region of the module may be flexed upwardly away from the upper surface of the exposed region of the module to be handled/gripped by an installer. Once received in the channel or slot or opening, the tool or hacksaw blade may bear against sides 209 of the slot or opening or channel so that movement of the tool about a rotational axis of the clip rotates the clip between the retracted and extended positions. Alternatively a tool may be fabricated on site from readily available sheet metal.

A proprietary tool may comprise features for assisting with engagement with the clip. For example a tool may have a round front end (much like a hacksaw blade) to make the tool easier to insert in the slot 208 of the clip. The front end of the tool may also have a tapered edge to prevent the front edge of the tool catching on edges of the module. The tool may have a gauge or marker to indicate when the tool has been inserted to the correct depth in the slot of the clip.

In some embodiments a base of the slot or channel or opening 208 is angled downwardly towards a front of the clip, as shown in FIG. 10. The base of the slot or channel or opening 208 is angled downwardly towards a front of the clip to receive an upwardly flexed tool. Typically the tool is flexed upwardly to reach the slot or channel or opening located behind the lip 106 of an overlapping module.

In some embodiments the module comprises a lip or step 118 (FIG. 10) for the tool end to ride up, to assist with flexing or bending the end of the tool upwardly to reach the clip behind underneath the exposed region of an overlapping module. The step 118 may have a chamfered forward facing surface to help direct the front of the tool upwards to reach the clip.

In some embodiments the clip comprises a shoulder or stop 211 for setting a depth of engagement of the tool with the clip. The stop prevents a user from inserting the tool too far and damaging components of the roofing, cladding or siding apparatus.

In some embodiments the module comprises a forwardly facing shoulder that extends between adjacent clips or clip recesses 109. The forwardly facing shoulder is located in the under lapping region of the module. In some embodiments the forwardly facing shoulder may be continuous between adjacent recesses 109. With reference to the embodiment of FIG. 1, in order to locate a clip to be rotated from the retracted position to the extended position, an installer may run a tool along forwardly facing shoulder 111 from right to left in FIG. 1 until a tip of the tool runs into the opening or slot or channel of the clip. Having found the clip with the tool, the installer may fully insert the tool into the clip and then rotate the clip from right to left to engage the clip with an overlapping module. To disengage a clip from the groove of an overlapping module an installer may run the tool along the forwardly facing shoulder 111 of the module from the left to right in FIG. 1 until a tip of the tool runs into the opening or slot or channel of the clip. Having found the clip the installer may fully insert the tool into the clip and then rotate the clip from left to right to disengage the clip from the groove of an overlapping module. The forward facing shoulder may also act as a flashing up-stand, to help prevent whether penetrating between the overlapping modules.

Figure 7D:
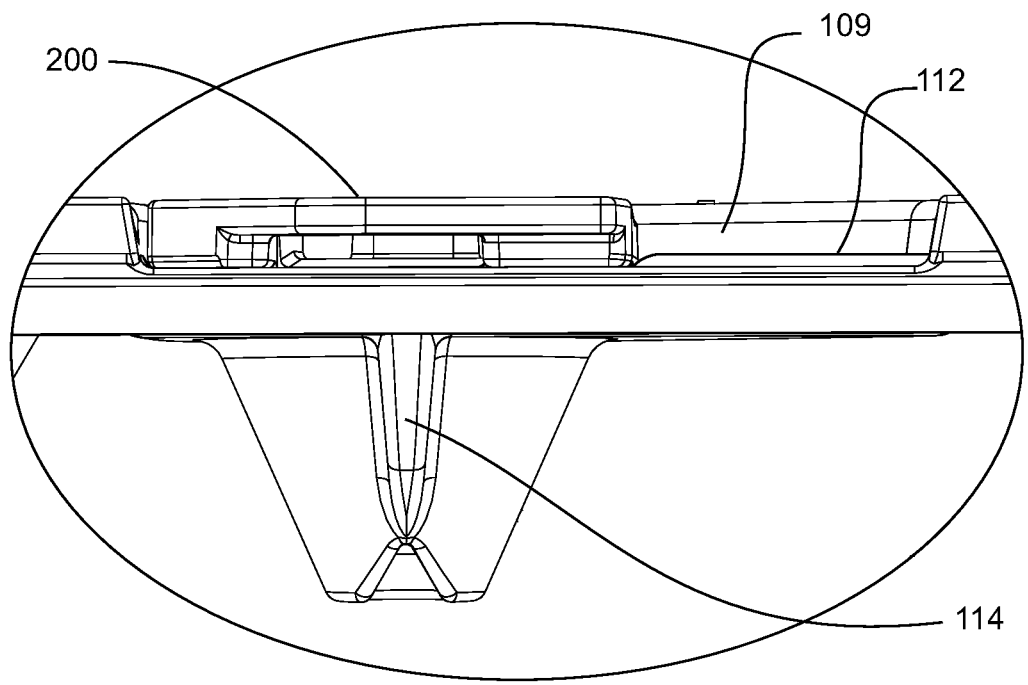
FIG. 7D shows a clip installed in the recess of FIG. 7C.

As shown in FIGS. 7C and 7D, in some embodiments the module may have a projection over which the clip rides when moved from the retracted position to the extended position. The projection 112 acts to retain the clip in the extended position.

When rotating between the retracted and extended positions the clip rotates on a rotational axis that is substantially perpendicular to a general plane of the module. In preferred embodiments the clip rotates on an axis of a fastener extending through the clip and the module. In some embodiments the clip rotates on an axis of a fastener hole of the clip. In some embodiments the axis of rotation of the clip is an axis of the fastener hole of the clip.

In some embodiments the clip rotates from the retracted position to the extended position in a direction of rotation of a fastener when securing the module to a building surface. For example, for a right hand threaded fastener, the clip rotates in a clockwise direction in plan view when rotating the clip from the retracted position to the extended position. Rotation of the clip therefore acts to tighten and not loosen the fastener when rotating from the retracted to the extended position. Also, when installing the clip to the module, the clip naturally assumes the extended position when tightening the fastener as the clip is rotated to the extended position in the direction of rotation of the fastener when securing the module to a building surface. Typically, the next row or course of modules is fitted to the previous row or course with the clips in the extended positions. Thus having the clips fitted to the module in the extended position by rotation of the fastener conveniently and efficiently sets the clip in the correct position for installation of the roofing, cladding or siding assembly.

In some embodiments the clip and/or the module are adapted so that the clip rotates by less than 60 degrees to rotate from the retracted position to the extended position. In the illustrated embodiment of FIG. 1 the clip rotates through an angle of rotation of about 50 degrees.

As the clip is rotated from the retracted position to the extended position the tongue gradually engages the groove of the adjacent module and is fully engaged with the groove when in the extended position. In some embodiments, at least a portion of the front edge of the tongue is angled or curved so that the distance from the centre of rotation of the clip (the rotational axis of the clip) to the front edge of the tongue increases from a leading side of the clip. The leading side (221 in FIG. 5) of the clip is the side of the clip that is closest to the front of the module when in the retracted position. This arrangement ensures the tongue of the clip is clear of the groove 107 when in the retracted position for a given angle of rotation between the retracted and extended positions. The front edge of the clip or the tongue of the clip extends between the sides 220, 221 of the clip. The front edge of the clip may be described as a cam surface, for gradually engaging the groove of an overlapping module. For example, in some embodiments a corner portion on a leading side of the tongue is chamfered or rounded off so the rounded corner or chambered corner is clear of the groove 107 of an adjacent overlapping module when the clip is in the retracted position. By rounding off or chamfering the leading corner of the clip, the angle of rotation of the clip between the retracted and extended positions can be reduced. Preferably the chamfer depth or radius of the rounded corner is in the range of 25% to 50% of the width of the clip.

Figure 6:
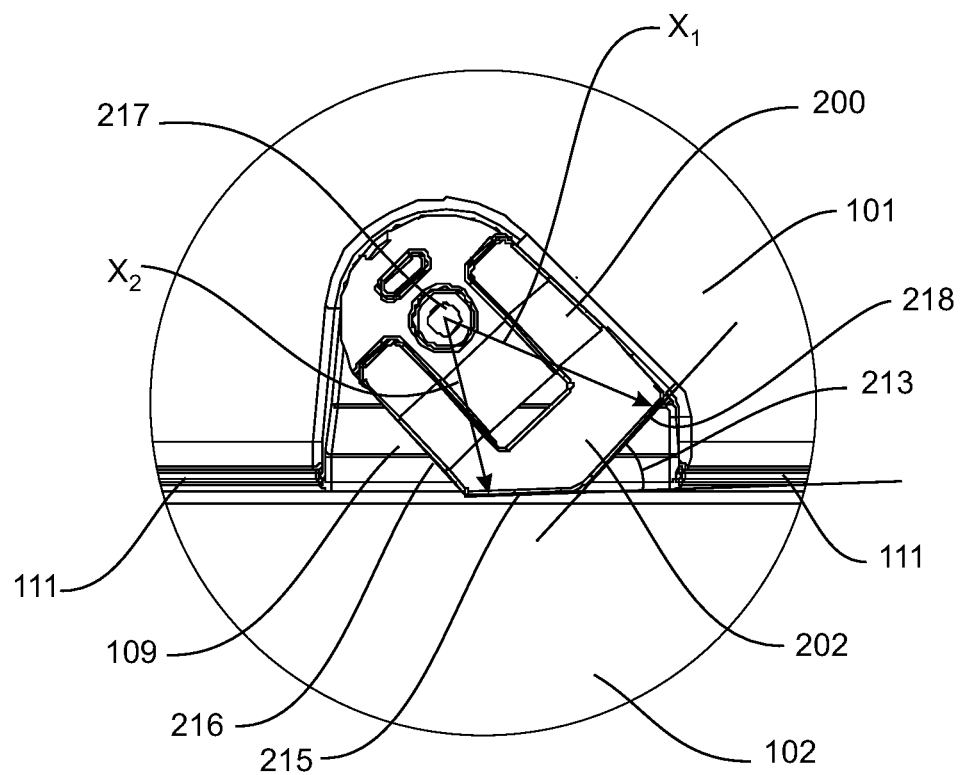
FIG. 6 shows in plan view a clip of the apparatus of FIG. 1 in the retracted position.

For example, with reference to FIG. 6, a portion 215 of the front edge of the clip is angled (in other words the leading corner of the clip is chamfered) so that the distance from the centre of rotation 217 of the clip increases along that portion 215 of the front edge from the leading side 216 of the clip. In some embodiments, a remaining portion 218 of the front edge of the clip is substantially parallel to or at a slight angle to the groove 107 when the clip is in the extended position to be engaged with the groove. In some embodiments the portion 215 of the front edge of the clip is at an angle to the remaining portion 218 of the front edge of the clip, wherein the angle (213, FIG. 6) is substantially equal to or greater than the angle of rotation of the clip from the retracted position to the extended position. In some embodiments angle 213 is slightly greater than the angle of rotation of the clip between the extended and retracted positions, for example 0.5 to 10 degrees, or 0.5 to 5 degrees greater than the angle of rotation.

In the above example embodiments, to ensure the clip engages and disengages the groove of the module when rotated between the extended and retracted positions, the distance from the centre of rotation of the clip to the front edge of the clip in a first direction is greater than the distance from the centre of rotation of the clip to the front edge of the clip in a second direction, wherein the first and second directions diverge from the centre of rotation of the clip. When in the extended position, the clip therefore extends further forward from the centre of rotation relative to the module than when in the retracted position. For example, as shown in FIG. 6, distance $X_2$ is less than distance $X_1$ so that when rotated by the angle of rotation from the extended position to the retracted position the clip disengages from the groove of the module. In some embodiments, when in the retracted position a forward most part of the clip is approximately parallel to or at an angle of less than 10 degrees to the groove of the module. In some embodiments, when in the extended position a forward most part of the clip is approximately parallel to or at an angle of less than 10 degrees to the groove of the module. In some embodiments, with the clip in the extended position, a distance from the centre of rotation of the clip to a forward most part of the front edge of the clip along a line perpendicular to the groove of the module is greater than a distance from the centre of rotation of the clip to a forward most part of the front edge of the clip along a line perpendicular to the groove of the module when the clip is in the retracted position. In some embodiments the average distance from the centre of rotation of the clip to a front edge of the clip on an extended position side of the clip is less than the average distance from the centre of rotation of the clip to a front edge of the clip on a retracted position side of the clip, the extended position and retracted position sides of the clip divided by a line perpendicular to the groove of the module extending through the centre of rotation of the clip when the clip is in the extended position.

In some embodiments, the portion of the tongue that initially enters the groove of the module may have a tapered or ramped section on an underside of the tongue, for example at location 212 in FIG. 9B. A tapered or ramp section may help to align the clip into the groove, for example in instances where an overlapping module is raised slightly above an installed position relative to an underlying module. As the clip is rotated into the groove, the ramp or tapered section of the tongue engages or acts on an inside surface of the lip 106 of the module to pull the module down onto the clip and the underlying module. The clip shown in FIG. 9E is illustrated with a ramped section 212 on the underside of the tongue. The ramp can account for a vertical misalignment of the overlapping module equal to the depth of the ramp, indicated by dimension "B".

Figure 5:
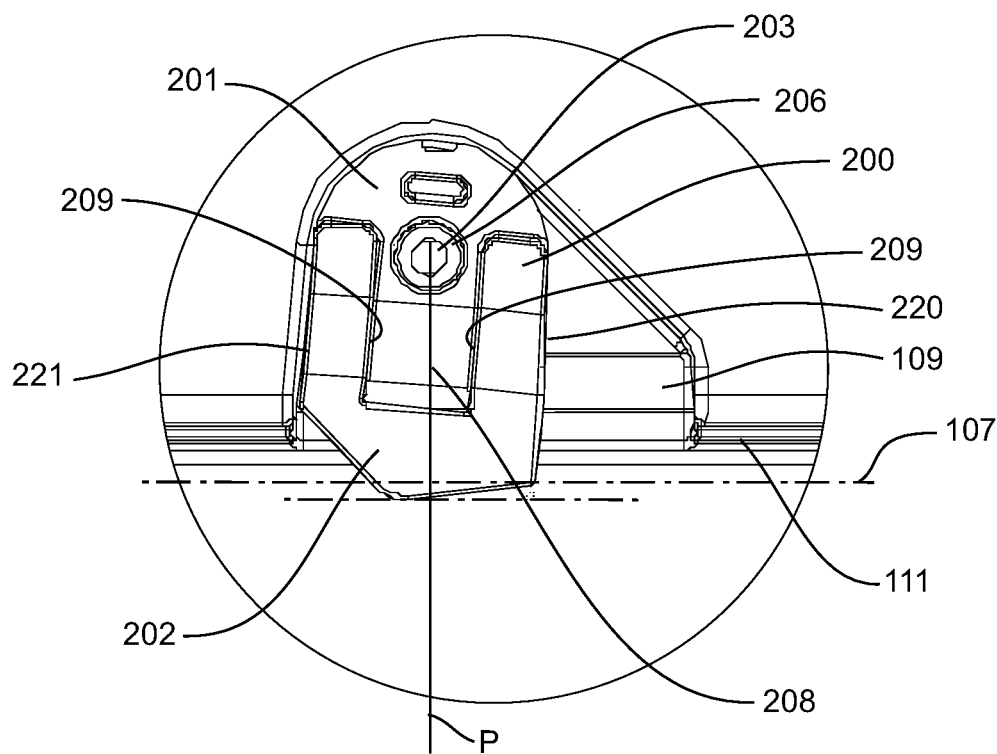
FIG. 5 shows in plan view a clip of the apparatus of FIG. 1 in the extended position.

In a preferred embodiment, when in the extended position at least a majority of a forward most part of the clip is positioned on an extended-position side of a line perpendicular to the groove of the module and extending through the centre of rotation of the clip. For example, with reference to FIG. 5 showing the clip in the extended position, the forward most part 219 of the clip is located on the extended-position side of the line P that is perpendicular to the groove 107 and extending through the centre of rotation of the clip. When installing a roof, cladding or siding, if the front edge of the clip is knocked, for example when fitting an overlapping module onto the clips of a previously laid row or course of modules, the most likely contact point between the clip and the module is at the forward most part of the clip 219. As this forward most part of the clip is located on the extended-position side of the line P, a force applied to the forward most part creates a moment of force about the centre of rotation 217 of the clip in the direction of rotation of the clip to the extended position. This arrangement therefore reduces the risk that the clip is inadvertently knocked from the extended position back towards the retracted position. Where a portion of the front edge of the clip for engaging/entering the groove of the module is parallel to the groove, preferably a majority of the length of the parallel portion is located on the extended side of the line P, such that a uniform force per length applied to the parallel portion causes a resultant moment of force about the centre of rotation of the clip in the direction of rotation of the clip from the retracted to the extended positions. To ensure at least a majority of the forward most part 219 of the clip is on the extended-position side of the line P, a portion of the clip extending from the forward most part 219 of the clip to the retracted side of the clip may be angled slightly away from a line parallel to the groove of the module. In some embodiments this angle is in the range 0.5 to 10 degrees, or 0.5 to 5 degrees. For example, in FIG. 5 the front edge of the clip when in the extended position is angled from about the line P to the retracted side of the clip at an angle beta (β) of about 5 degrees relative to a line parallel to the groove. In some embodiments to ensure at least a majority of the forward most part 219 of the clip is on the extended-position side of the line P, a portion of the clip extending from the forward most part 219 of the clip to the retracted side of the clip may be curved slightly away from a line parallel to the groove of the module. The portion of the clip extending from the forward most part 219 of the clip to the retracted side of the clip is angled or curved slightly away from a line parallel to the groove so that preferably at least a majority of the front edge of the clip between line P and the retracted side of the clip is received in the groove when the clip is in the extended position. In FIG. 5, all of the front edge of the clip between line P and the retracted or trailing side 220 of the clip is received in the groove 107 when the clip is in the extended position as shown.

As illustrated in FIGS. 7D and 10 to 12, in some embodiments the module comprises one or more ramp surfaces 114 positioned at or adjacent to a front region of the underlapping region 101 of the module 100 (or at or adjacent a rear region of the exposed region of the module). The ramp surfaces 114 are provided to an under surface of the module. During installation of a roof for example, the ramp surfaces 114 provide a locating surface or location means for locating or positioning an overlapping module to an already installed underlapping module. During installation, an installer may place the module over an already installed module, and by pushing downwards on the fixing region 103 of the module, the module aligns down the ramp surfaces to be installed correctly relative to the underlying module. Once in position the module may be fixed to the building surface by fasteners applied through the under lapping region of the module. With the under lapping region of a module making contact with the building surface, and the ramp or shoulder 114 making contact with an underlying module, adequate depth of engagement between the groove of the module and the clip of the underlying module is provided. In some embodiments the module and clip are adapted so that the tongue of the clip engages with the groove by a depth in the range of 2 mm to 15 mm, or 2 mm to 10 mm, or 2 mm to 8 mm, or 2 mm to 6 mm, or 2 mm to 4 mm, or about 3 mm.

Figure 12:
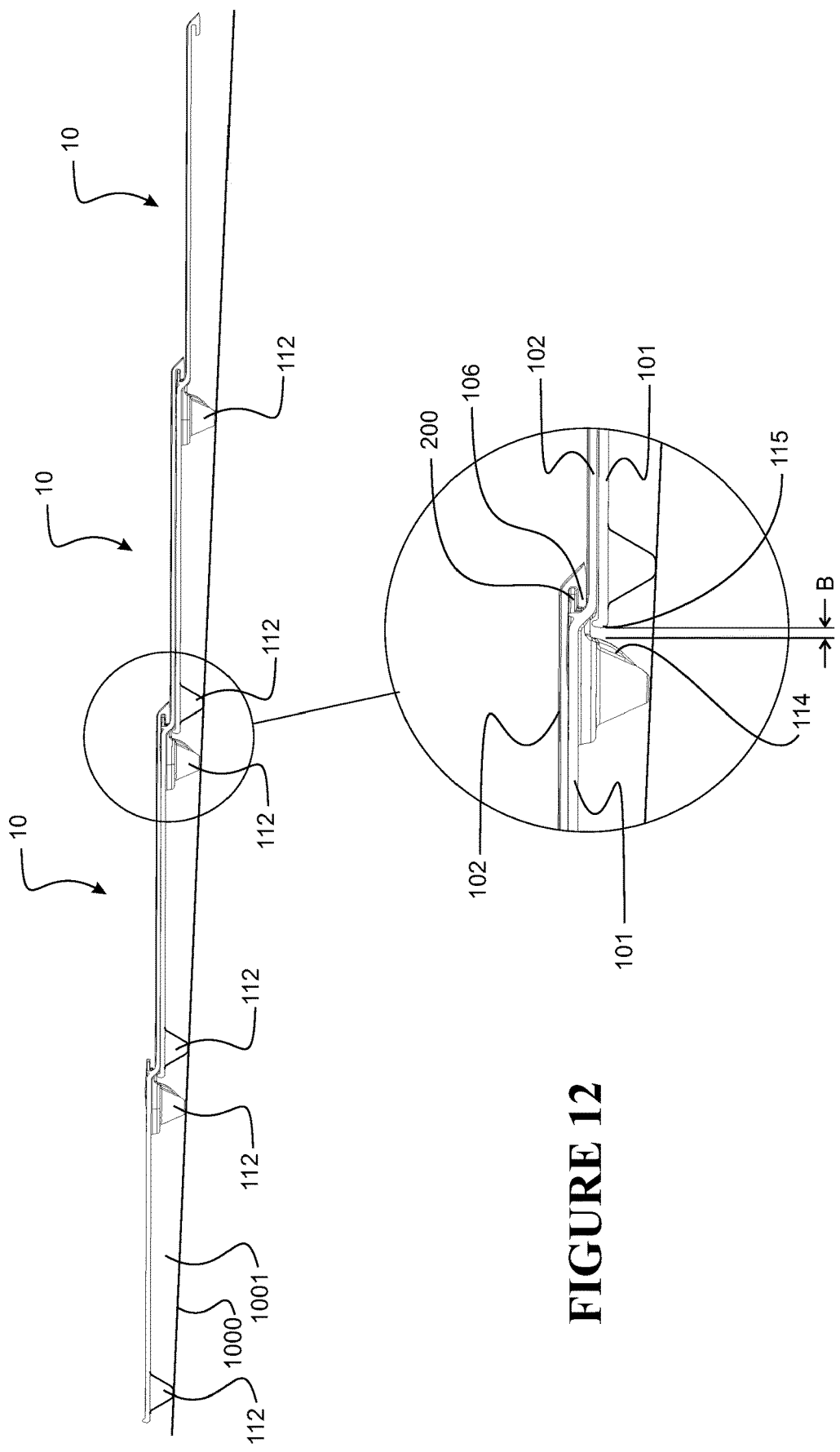
FIG. 12 illustrates three apparatus' of FIG. 1 in an overlapping installed relationship.

As illustrated in FIGS. 11 and 12, where a ramp or shoulder 114 is provided for bearing against a back edge 115 of the module, preferably a distance (D1) between the rear edge of the module and a front edge of the tongue with the clip in the extended position is less than a distance (D2) between the shoulder 114 and a base 116 of the groove 107. This allows for some clearance between the rear edge of the module and the shoulder 114, and/or clearance between the front edge of the tongue 202 and the base 116 of the groove. With the tongue inserted fully into the groove, a clearance B between the rear edge 115 of the module and the shoulder 114 is illustrated in FIG. 12. Alternatively, with the shoulder of the module pressed against the rear edge of an underlapping module, the clearance B exists between the base 116 of the groove 107 and the front edge of the clip fixed to the underlapping module. The clearance allows for thermal expansion of the underlapping region of the module relative to the exposed region of an overlapping module. Also, some clearance (e.g. clearance B in FIG. 12) provides for some movement between adjacent modules, either during installation or after installation, and/or allows for some misalignment between modules or to accommodate building surfaces that are not square.

The back edge acts as a shoulder or bearing surface for bearing against shoulder 114 of an overlapping module, to set the relative position of adjacent modules to ensure a clearance between the front edge of the clip and the base of the groove. In some embodiments, the module may comprise a ramp surface or shoulder for bearing against a corresponding shoulder of an underlapping module located at a position away from the back edge of the module. For example, the module may comprise a ramp surface or shoulder extending from the undersurface of the overlapping region, and a corresponding shoulder or ramp surface extending from the upper surface of the underlapping region. The shoulder or ramp extending from the undersurface of the overlapping region bears against the corresponding shoulder or ramp surface extending from the upper surface of the underlapping region of an adjacent underlapping module, to set the relative positions of the modules. The distance between the corresponding shoulder or shoulders extending from the upper surface of the underlapping region and a front edge of the tongue of the clip when in the extended position is less than the distance between the ramp surface or shoulder extending from the undersurface of the overlapping region and the base of the groove, to provide a clearance between a front edge of the tongue and the base of the groove of an overlapping module.

Figure 15:
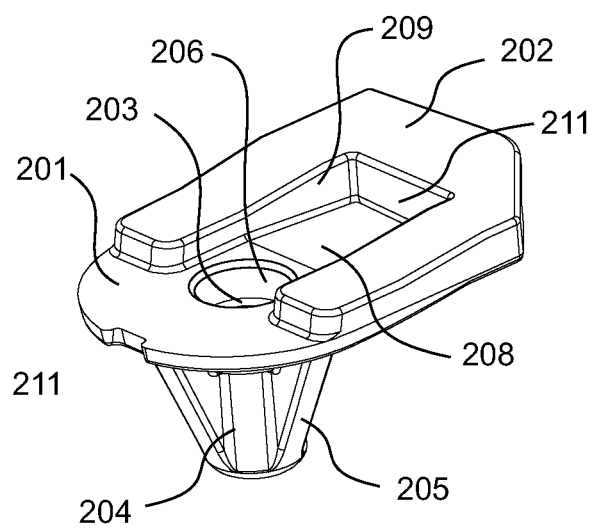
FIG. 15 illustrates an alternative clip for engaging a forwardly facing groove of a module.

In the illustrated embodiments of FIGS. 1 to 12 the lip extends rearward from the exposed region so that the groove 106 is open towards the rear of the module. In such an embodiment the tongue of the clip extends forwardly when in the extended position to engage the rearward facing groove. In an alternative embodiment the module may comprise a projection or lip 106 extending forwardly from the exposed region so that the groove 107 is open towards a front of the module. In such an embodiment the tongue of the clip extends rearward when in the extended position to engage the forwardly facing groove. In embodiments where the groove is open towards the front of the module, the lip and groove are positioned a distance from the front edge of the module and the clip for retaining the exposed region to the building surface is positioned under the exposed region in between a front edge of the module and the groove. A clip for engaging a forward facing groove is illustrated in FIG. 15. This clip is similar to the clip of FIGS. 9A to 9E. However to engage the clip of FIG. 15 a tool enters the channel 208 from a back end of the clip (an opposite end compared to the clip of FIGS. 9A to 9E). The depth of engagement of the tool may be set by a shoulder or end stop 211 positioned at a rear of the tongue 202. In all embodiments described the front of the clip is an end of the clip that engages the groove 107 of the module. Thus in an embodiment such as that shown in FIG. 16, a forward most part of the clip is oriented towards the rear of the module when in the extended position and engaged with the groove of the module.

Figure 14:
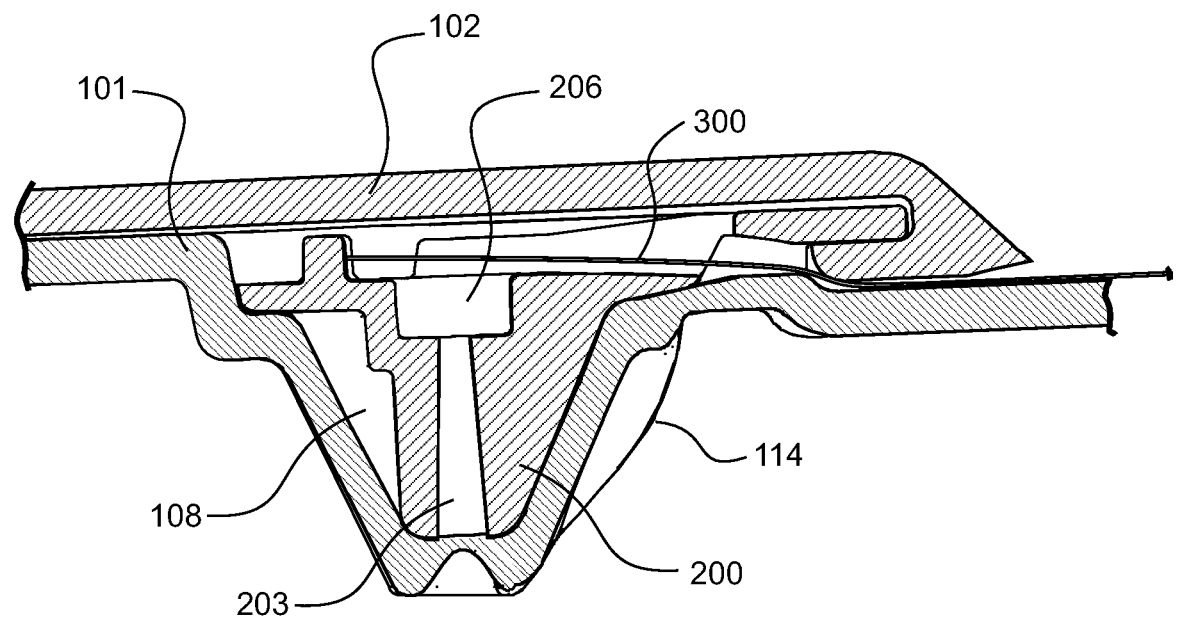
FIG. 14 is a part cross section of the clip fitted to an underlying module and securing a front region of an overlapping module.
Figure 16:
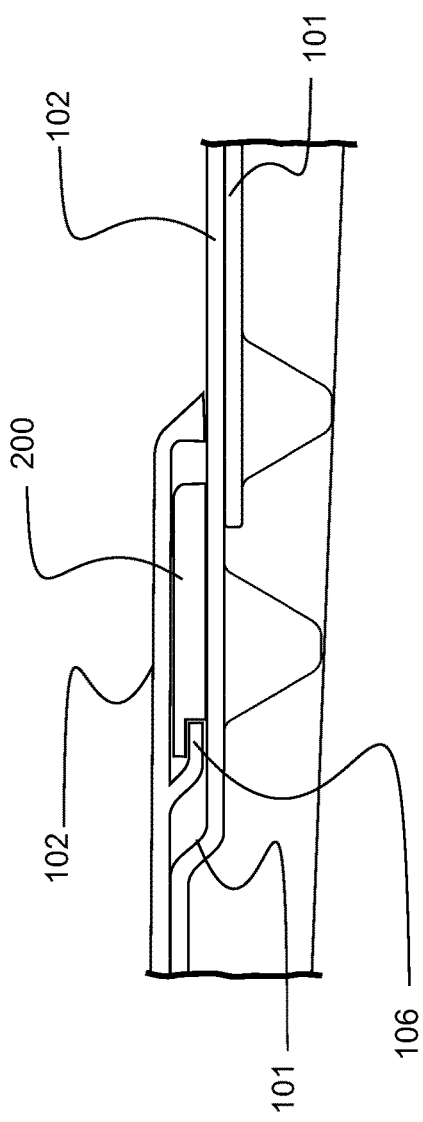
FIG. 16 illustrates a portion of three overlapping modules comprising a rear facing clip engaging a forward facing groove of the exposed region of an overlapping module.

A forwardly facing groove may be preferred for installation of modules on a particularly steep or vertical building surface, as each module added to the building surface may initially be supported or 'hung' on the front end or tongue of the rearward facing clips of the previous row or course of modules. However, a rearward facing groove as illustrated in FIGS. 11, 12 and 14 may be preferred in high wind loading applications as a rearward facing groove may be positioned at the front edge of the module as illustrated such that the front edge of the exposed region is secured to the building surface. In embodiments having a forwardly facing groove, the exposed region of the module that is forward of the groove and covering the clip is not secured to the building surface. An example embodiment having a forward facing groove provided is illustrated in FIG. 16.

Figure 17:
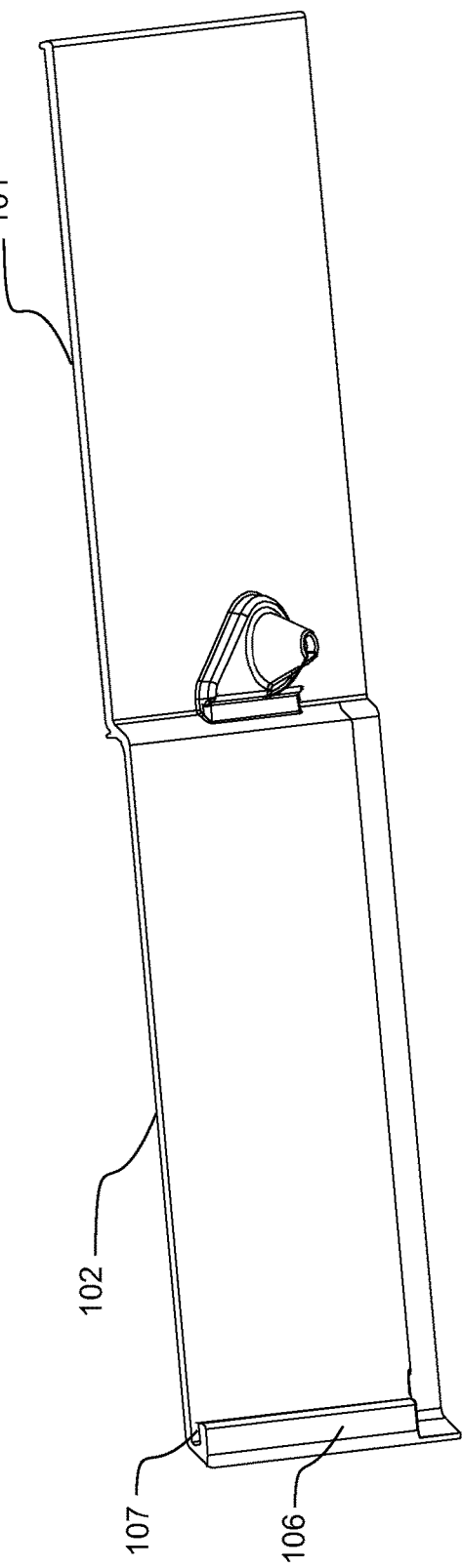
FIG. 17 shows the undersurface of a module showing one form of a lip forming a groove at the front edge of the module.
Figure 18:
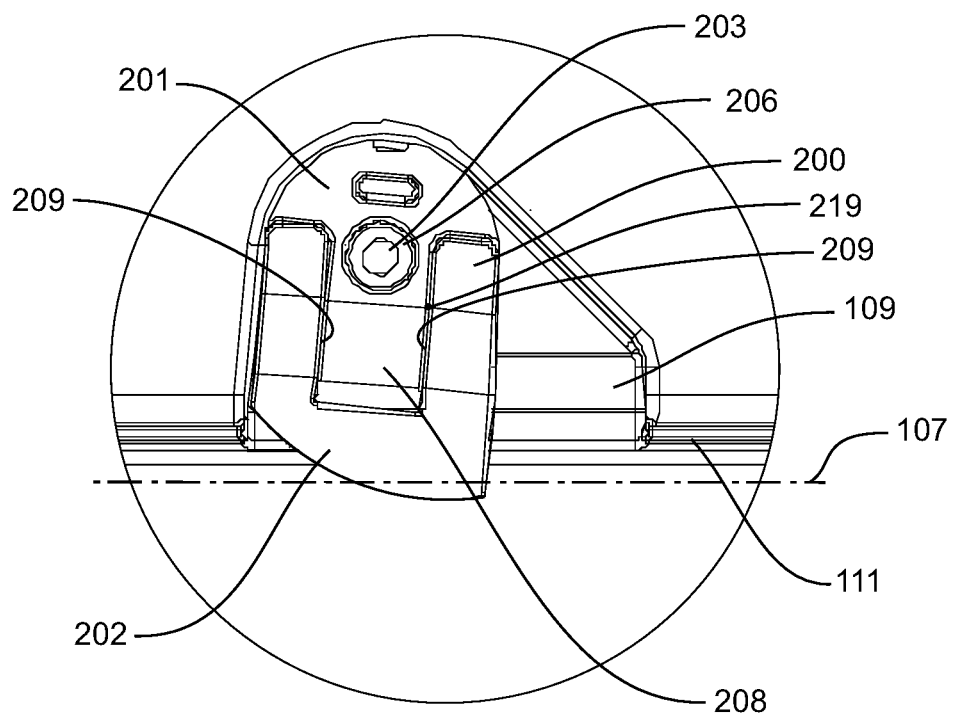
FIG. 18 shows in plan view an alternative clip and the module of the apparatus of FIG. 1 shown in part, with the clip in the extended position.
Figure 19:
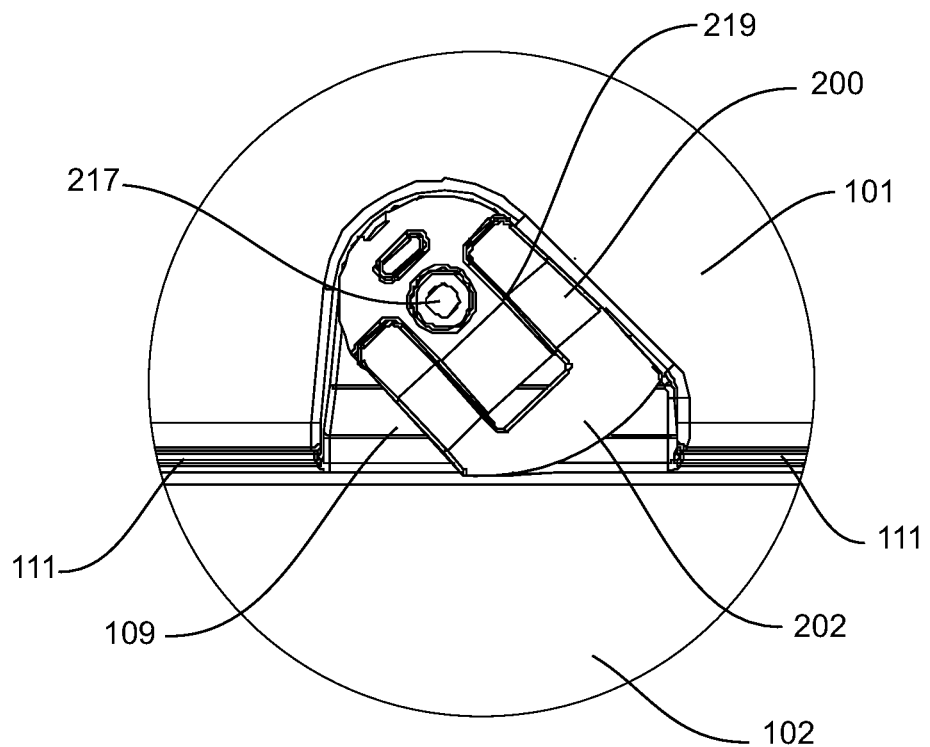
FIG. 19 shows the clip of FIG. 18 in the retracted position.

As shown in FIG. 17, in some embodiments the lip 106 is continuous along the length of the module 100, so that the groove 107 is continuous along the length of the module. In some alternative embodiments the lip may be discontinuous along the length of the module. In other words, the module may comprise a plurality of lips spaced apart along the length of the module, each lip forming a groove between the lip and the under surface of the exposed region of the module. Preferably in embodiments having a plurality of spaced apart lips, a distance between each lip is less than a width of the clip, so that the clips engage at least a portion of a groove regardless of the relative side-to-side positions of the overlapping modules.

As described above, in some embodiments the module 100 may be formed in a continuous forming operation. A number of materials are suitable for use in the production of a roofing, siding and/or cladding modules by a continuous forming process; however it is most cost effective to produce the module from a foamed material (e.g. foamed polycarbonate). Not only does this reduce the amount of raw material required for production, but also results in a lightweight product. This can be advantageous in the retrofitting of roofing or cladding to an existing building. For example, where there is a building with an existing but degraded roof, re-roofing can occur by placing the new lightweight modules directly over top of the existing roofing material (usually asphalt shingle).

The foamed polycarbonate (or alternative substrate material) may be accompanied by one or more additional materials to enhance the properties of the product. A suitable material is thermoplastic polyurethane (TPU) or thermoplastic polyolefin (TPO), which can be fed into the moulding process along with the polycarbonate. Foamed polycarbonate and similar materials are favoured in roofing products because they have fire retardant properties, but the addition of a TPU or TPO layer improves the performance of the product because they have better durability, physical properties and resistance to environmental wear. In particular, TPU and TPO is puncture resistant, tear resistant, and UV resistant, and will retain the aesthetic appeal of the product for a longer period of time compared to polycarbonate alone.

Other materials which may be used include (but are not limited to) polycarbonate (PC), general purpose polystyrene (GPPS), polymethyl methacrylate (PMMA), polyethylene terephthalate (PET), polyester methacrylate (PEM), polypropylene (PP), high impact polystyrene (HIPS), acrylonitrile butadiene styrene (ABS), polyester (PES), polyamides (PA), polyvinyl chloride (PVC), polyurethanes (PU), polyvinylidene chloride (PVDC), polyethylene (PE), polytetrafluoroethylene (PTFE), polyetheretherketone (PEEK) (polyetherketone), polyetherimide (PEI), polyimide (PI), polylactic acid (PLA), acrylics, amorphous polymers, high density polyethylene (HDPE), low density polyethylene (LDPE), linear low density polyethylene (LLDPE), medium density polyethylene (MDPE), cross linked polyethylene (PEX), ethylene vinyl acetate (EVA), ethylene vinyl alcohol (EVOH), thermoplastic elastomer (TPE), thermoplastic rubber (TPR), polypropylene (PP), fluorinated ethylene propylene (FEP), polybutylene terephthalate (PBT), polyoxymethylene (POM), polyphenylene oxide (PPO), polypropylene homopolymer (PP-H), polypropylene copolymer (PP-C), silicon polymers, styrene-acrylonitrile resin (SAN) and thermoplastic rubber. The materials may be a blend of any or all of these. The materials may also comprise additives to enhance properties such as resistance to fracture, impact, ultraviolet light, and thermal or tensile stresses. Materials which could also be considered in manufacture are various polystyrenes, nylons, acrylics, polyethylene, thermoplastic ethylene, polypropylene and phenolic, and combinations of or containing these. No matter which materials are chosen, the materials must be compatible so that they do not delaminate. If the materials are not compatible, they may still be used; however, a tie or bond layer must be introduced between them.

Examples of tie or bond layers include, but are not limited to, ethylene vinyl acetate (EVA), thermoplastic polyolefin (TPO), thermoplastic elastomer (TPE), silicon adhesives, epoxy adhesives, and acrylic adhesives. One of skill in the art is capable of choosing materials in the appropriate combinations to suit the purposes described herein.

In some embodiments the clip may be formed from a plastics material, for example by injection moulding. Materials which may be used include (but are not limited to) polycarbonate (PC), general purpose polystyrene (GPPS), polymethyl methacrylate (PMMA), polyethylene terephthalate (PET), polyester methacrylate (PEM), high impact polystyrene (HIPS), acrylonitrile butadiene styrene (ABS), polyamides (PA), polyvinyl chloride (PVC), polyethylene terephthalate (PET, polypropylene (PP), Polybutylene terephthalate (PBT), Polyoxymethylene (POM), Polyphenylene oxide (PPO), Polypropylene homopolymer (PP-H) Polypropylene copolymer (PP-C), styrene-acrylonitrile resin (SAN), or any other suitably rigid material, for example aluminum, steel, extruded or pressed from a sheet material. The materials may be a blend of any of these. The materials may also comprise additives to enhance properties such as resistance to fracture, impact, ultraviolet light, and thermal or tensile stresses.

A roofing, siding and/or cladding apparatus according to the present invention may be used to form a weatherproof covering over top of a building surface. In addition to forming a weatherproof covering, in some embodiments a roofing, siding and/or cladding apparatus according to the present invention may be used as part of a thermal energy recovery system. Furthermore, in addition to forming a weatherproof covering, and optionally in addition to being useful as part of a thermal energy recovery system, in some embodiments a roofing, siding and/or cladding apparatus according to the present invention may bear an array of solar cells to generate electrical energy.

For example, with reference to FIG. 12, in some embodiments the under lapping region of the module may comprise feet or projections 112 to provide a gap 1001 between an under side of the module and a building surface 1000 covered by the lapping modules. The gap 1001 allows the passage of an air stream between the module and the building surface. The gap can be maintained by features of shape integral to the module or by additional spacer/stand-off/feet components. Thus, the roof assembly comprising overlapping modules forms a layer on top of the building surface but the formed features (i.e., the profiled "feet" 112 on the underside of the underlapping region) make the stand-off for the air to pass through. Air in the gap between the building surface and lapping modules may be warmed by conduction of heat from the modules (heated by solar radiation). Warm air in gap 1001 may be drawn up a roofing surface and collected in ducts near the upper edge of the roofing surface. The warm air can be exhausted directly to the atmosphere or used elsewhere in the building.

Another embodiment of the roofing, siding and/or cladding product of the current invention is that which is adapted for use in a system to generate electrical energy from solar power. Such products are generally referred to as building integrated photovoltaic products ("BIPV"). A series or array of photovoltaic cells may be carried on the exposed region of the module so that they capture photons when installed on a building surface. For example, an energy generating module may comprise one or more moulded material layers 100, a solar array layer of connected photovoltaic cells, and an optional transparent surface laminate layer. The energy generating module may also comprise bonding/encapsulation/tie layers to the front and/or back of the PV layer and may also contain layers to stop the corrosion of the PV layer e.g. polyethylene, EFTE, etc. The photovoltaic cells installed on a module may be arranged in a row and connected via two bus strips extending the entire length of the module; one running across the upper edges of the cells and one running across the lower edges so that only a single electrical junction for each module need be connected to a main power take-off on installation. A further option is to have a bus strip material integrally moulded into the module during the forming process. The modules may be molded to accommodate various components of the photovoltaic system. For example, as shown in FIG. 1, the upper surface of the underlapping region may include channels 113 configured to receive cables or wires of the photovoltaic array. Moreover, the upper surface of the underlapping region may also include formed cavities configured to receive junction boxes, printed circuit boards (PCB), communication devices, cables, wires, buses, components, cells, or diodes, and the like of the photovoltaic array. Thus, the modules may contain all of the hardware and software required to connect and regulate the PV cells. Because there are no penetrations between the two overlapping modules, the assembly can be completely waterproofed. Example thermal energy recovery modules and modules comprising an array of solar cells for electrical energy generation, and methods for the continuous forming process for manufacturing such modules are described in WO2013/081477.

The present invention may provide benefits to the roofing, cladding and siding industries and to the building industry generally including any industry requiring external cladding, for example inside tunnels, underwater, banks, walls etc. The present invention may provide a number of benefits, for example, the apparatus according to some embodiments enables the front edge of the roofing, cladding or siding module to be held down/locked in place to prevent wind lift damage or the module being torn away. The use of the clips described may provide higher strength fixing of the exposed region of the module compared to gluing a front edge of modules such as shingles down, and may have much greater longevity and withstand a higher wind loading. The present invention allows for thermal expansion of the module. Where adhesives are used and the adhesive is stronger than the module surface, thermal expansion may result in damage to the module. Furthermore, the installation of roofing modules such as tiles and shingles using adhesives during periods of low temperature or in colder climates has proved problematic and many product warranties exclude cover where installation has been carried out at lower/cooler temperatures. This is because many products on the market contain thermal sealants to hold the front edge of the roofing module in place. If the surface temperature is not at a sufficiently high level the sealant will not bond properly and as a result the roof will be more susceptible to damage from wind lift and may also have weather tightness issues. The clip according to some embodiments of the present invention avoids the requirement for sealants and adhesives and can be used to install modules in any weather conditions. In some embodiments, the clip when fixed in place provides a weatherproof seal via a seal on the screw head and the positioning of the clip under the module. The clip itself is very easy to engage/lock and disengage/unlock to enable easy replacement of the module. The clip therefore provides for rapid installation of a roofing, cladding or siding assembly, and the mechanical fixing of the module occurs instantly. In contrast bonding requires a correct bonding temperature for a period of time for the adhesive to cure or set. In some embodiments the clip provides a slot for a tool to be inserted to enable the tool to be either engaged or disengaged. The tool could be any type of sheet metal or, as described above, a hacksaw blade. Other materials such as rigid plastic materials may also be suitable for the tool.

In some embodiments the clip fixes an underlying module with a fastener to a building surface while at the same time fixes the front of the overlapping module. This arrangement may reduce installation time. Furthermore the front of the module can be engaged with the clip and then be slid sideways if it is not quite in alignment with the required installation position, or to engage or over or under lap (side lap joint) an adjacent side-by-side module. This allows a roofing, siding or cladding assembly to be laid either right to left or left to right.

The clip is covered by the exposed region of an overlapping region. Therefore the clip is not externally visible. This provides an aesthetic roofing, cladding or siding finish, and also provides the benefit that the clip is hidden from solar radiation/ultra violet light which can degrade some materials over time.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

All references cited herein are incorporated by reference in their entireties and for all purposes to the same extent as if each individual publication, patent, or patent application was specifically and individually incorporated by reference in its entirety for all purposes.

The invention claimed is:

1. A roofing, cladding, or siding apparatus comprising:
a roofing, cladding, or siding module comprising:
an underlapping region and an exposed region, wherein the underlapping region is adapted to be substantially covered by the exposed region of an adjacent overlapping module when installed on a building surface, an outer surface and an under surface, and
- a projection extending from the exposed region to provide a bearing surface facing the under surface of the exposed region, and one or more clips attachable to the underlapping region to provide a tongue adapted to be received between the bearing surface and the under surface of the exposed region of an adjacent overlapping module when installed on a building surface, wherein the one or more clips are configured to rotatably engage with an adjacent overlapping module, wherein the one or more clips and the module are complementarily adapted for the clip to rotate between an extended position wherein the tongue is received between the bearing surface and the under surface of the exposed region of an adjacent module and a retracted position wherein the tongue is withdrawn from between the bearing surface and the under surface of the exposed region of the adjacent module.

2. An apparatus as claimed in claim 1, wherein the projection forms a groove between the projection and the under surface of the exposed region, the tongue of the clip adapted to be received in the groove of an adjacent overlapping module when installed on a building surface.

3. An apparatus as claimed in claim 2, wherein the projection extends rearward from the exposed region so that the groove is open to the rear of the module to receive the tongue of the clip attached to an adjacent underlapping module when facing forwardly.

4. An apparatus as claimed in claim 3, wherein the projection extends from a front portion of the exposed region such that the groove is adjacent a front edge of the module, and the one or more clips attachable to a front portion of the underlapping region.

5. An apparatus as claimed in claim 1, wherein the clip comprises a base, the tongue extending from the base, and a fastener hole through the base for securing the one or more clips and the module to the building surface.

6. An apparatus as claimed in claim 1, wherein the module comprises a recess for receiving the clip at the underlapping region.

7. An apparatus as claimed in claim 1, wherein the clip comprises a sealing surface and the underlapping region comprises a corresponding seat, the sealing surface of the clip adapted to form a substantially watertight seal with the seat.

8. An apparatus as claimed in claim 1, wherein the clip comprises a post and the module comprises a corresponding socket for receiving the post, the clip rotating in the socket on an axis of the post between the retracted and extended positions.

9. An apparatus as claimed in claim 1, wherein the module comprises end stops for rotation of the clip between the retracted and extended positions, the end stops defining the retracted and extended positions of the clip, wherein the module comprises a recess for receiving the clip at the underlapping region, sides of the recess providing the end stops.

10. An apparatus as claimed in claim 1, wherein the clip is adapted to receive a tool to rotate the clip between the extended position and the retracted position, the clip comprises a channel or opening or slot for receiving the tool to couple the tool to the clip.

11. An apparatus as claimed in claim 10, wherein the channel or opening or slot is positioned underneath the tongue of the clip to receive the tool from a front end of the clip.

12. An apparatus as claimed in claim 1, wherein the clip comprises a fastening hole for receiving a fastener for securing the one or more clips and the module to the building surface, and wherein the clip rotates on an axis of the fastening hole or fastener extending through the hole.

13. An apparatus as claimed in claim 1, wherein at least a portion of the front edge of the clip is angled or curved so that the distance from the centre of rotation of the clip to the front edge of the clip increases from a leading side of the clip along the front edge of the clip so that the front edge of the clip is withdrawn from between the bearing surface and the under surface of the exposed region when the clip is in the retracted position.

14. An apparatus as claimed in claim 1, wherein the projection forms a groove between the projection and the under surface of the exposed region, the tongue of the clip adapted to be received in the groove of an adjacent overlapping module when installed on a building surface, and when in the extended position at least a majority of a forward most part of the clip is positioned on an extended-position side of a line perpendicular to the groove of the module and extending through the centre of rotation of the clip.

15. An apparatus as claimed in claim 1, wherein the module comprises a ramp surface or shoulder or a plurality of ramp surfaces or shoulders spaced apart along the length of the module and extending from the under surface of the module, and a corresponding shoulder or shoulders for bearing against the ramp surface or shoulder or plurality of ramp surfaces or shoulders extending from the under surface of an overlapping module.

16. An apparatus as claimed in claim 15, wherein the ramp surface or shoulder or the plurality of ramp surfaces or shoulders spaced apart along the length of the module are located at or adjacent to a front edge of the under lapping region for locating the module to a rear edge of an under lapping module, the rear edge of the module providing the corresponding shoulder or shoulders for bearing against the ramp surface or shoulder or plurality of ramp surfaces or shoulders extending from the under surface of an overlapping module.

17. An apparatus as claimed in claim 15, wherein the projection forms a groove between the projection and the under surface of the exposed region, the tongue of the clip adapted to be received in the groove of an adjacent overlapping module when installed on a building surface, and wherein a distance between the corresponding shoulder or shoulders and a front edge of the tongue of the clip when positioned to be received in the groove of an adjacent overlapping module is less than a distance between the ramp surface or shoulder or plurality of ramp surfaces or shoulders and a base of the groove, to provide a clearance between a front edge of the tongue and the base of the groove of an overlapping module.

18. A roofing, cladding, or siding module comprising:
- an underlapping region and an exposed region, wherein the underlapping region is adapted to be substantially covered by the exposed region of an adjacent module when installed on a building surface,
- an outer surface and an under surface,
- a projection extending from the exposed region to provide a bearing surface facing the under surface of the exposed region, and
- one or more location details in the underlapping region each for receiving a rotatable clip comprising a tongue adapted to be rotatably received between the bearing surface and the under surface of the exposed region of an adjacent overlapping module when installed on a building surface, wherein the rotatable clip and the adjacent overlapping module are complementarily adapted for the rotatable clip to rotate between an extended position wherein the tongue is received between the bearing surface and the under surface of the exposed region of the adjacent overlapping module and a retracted position wherein the tongue is withdrawn from between the bearing surface and the under surface of the exposed region of the adjacent overlapping module.

19. A module as claimed in claim 18, wherein the projection forms a groove between the projection and the under surface of the exposed region, the tongue of the clip adapted to be received in the groove of an adjacent overlapping module when installed on a building surface.

20. A module as claimed in claim 19, wherein the projection extends rearward from the exposed region so that the groove is open to the rear of the module to receive the tongue of the clip attached to an adjacent underlapping module when facing forwardly.

21. A module as claimed in claim 20, wherein the projection extends from a front portion of the exposed region such that the groove is adjacent a front edge of the module, and the one or more clips attachable to a front portion of the underlapping region.

22. A module as claimed in claim 18, wherein the clip comprises a base, the tongue extending from the base, and a fastener hole through the base for securing the clip and the module to the building surface.

23. A module as claimed in claim 18, wherein the module comprises a recess for receiving the clip at the underlapping region.

24. A module as claimed in claim 18, wherein the clip comprises a sealing surface and the underlapping region comprises a corresponding seat, the sealing surface of the clip adapted to form a substantially watertight seal with the seat.

25. A module as claimed in claim 18, wherein the clip comprises a post and the module comprises a corresponding socket for receiving the post, the clip rotating in the socket on an axis of the post between the retracted and extended positions.

26. A module as claimed in claim 18, wherein the module comprises end stops for rotation of the clip between the retracted and extended positions, the end stops defining the retracted and extended positions of the clip, wherein the module comprises a recess for receiving the clip at the underlapping region, sides of the recess providing the end stops.

27. A module as claimed in claim 18, wherein the clip is adapted to receive a tool to rotate the clip between the extended position and the retracted position, the clip comprises a channel or opening or slot for receiving the tool to couple the tool to the clip.

28. A module as claimed in claim 27, wherein the channel or opening or slot is positioned underneath the tongue of the clip to receive the tool from a front end of the clip.

29. A module as claimed in claim 18, wherein the clip comprises a fastening hole for receiving a fastener for securing the clip and the module to the building surface, and wherein the clip rotates on an axis of the fastening hole or fastener extending through the hole.

30. A module as claimed in claim 18, wherein at least a portion of a front edge of the clip is angled or curved so that the distance from the centre of rotation of the clip to the front edge of the clip increases from a leading side of the clip along the front edge of the clip so that the front edge of the clip is withdrawn from between the bearing surface and the under surface of the exposed region when the clip is in the retracted position.

31. A module as claimed in claim 18, wherein the projection forms a groove between the projection and the under surface of the exposed region, the tongue of the clip adapted to be received in the groove of an adjacent overlapping module when installed on a building surface, and when in the extended position at least a majority of a forward most part of the clip is positioned on an extended-position side of a line perpendicular to the groove of the module and extending through the centre of rotation of the clip.

32. A module as claimed in claim 18, wherein the module comprises a ramp surface or shoulder or a plurality of ramp surfaces or shoulders spaced apart along the length of the module and extending from the under surface of the module, and a corresponding shoulder or shoulders for bearing against the ramp surface or shoulder or plurality of ramp surfaces or shoulders extending from the under surface of an overlapping module.

33. A module as claimed in claim 32, wherein the ramp surface or shoulder or the plurality of ramp surfaces or shoulders spaced apart along the length of the module are located at or adjacent to a front edge of the under lapping region for locating the module to a rear edge of an under lapping module, the rear edge of the module providing the corresponding shoulder or shoulders for bearing against the ramp surface or shoulder or plurality of ramp surfaces or shoulders extending from the under surface of an overlapping module.

34. A module as claimed in claim 32, wherein the projection forms a groove between the projection and the under surface of the exposed region, the tongue of the clip adapted to be received in the groove of an adjacent overlapping module when installed on a building surface, and wherein a distance between the corresponding shoulder or shoulders and a front edge of the tongue of the clip when positioned to be received in the groove of an adjacent overlapping module is less than a distance between the ramp surface or shoulder or plurality of ramp surfaces or shoulders and a base of the groove, to provide a clearance between the front edge of the tongue and the base of the groove of an overlapping module.

* * * * *